United States Patent [19]

Kaneishi et al.

[11] Patent Number: 5,639,417
[45] Date of Patent: Jun. 17, 1997

[54] MOLD APPARATUS FOR PROCESS FOR INJECTION MOLDING

[75] Inventors: Akimasa Kaneishi; Sinji Kiboshi; Isamu Mio, all of Hiratsuka, Japan

[73] Assignee: Mitsubishi Gas Chemical Company, Inc., Tokyo, Japan

[21] Appl. No.: 463,268

[22] Filed: Jun. 5, 1995

[30] Foreign Application Priority Data

Jul. 15, 1994 [JP] Japan .................... 6-164334
Mar. 31, 1995 [JP] Japan .................... 7-099715

[51] Int. Cl.$^6$ .................... B29C 45/00
[52] U.S. Cl. .................... 264/572; 425/130
[58] Field of Search .................... 264/573; 425/130

[56] References Cited

U.S. PATENT DOCUMENTS

| | | | |
|---|---|---|---|
| 4,101,617 | 7/1978 | Friederich | 264/572 |
| 4,129,635 | 12/1978 | Yasuike et al. | 264/572 |
| 5,254,306 | 10/1993 | Inada et al. | 264/572 |
| 5,277,865 | 1/1994 | Hara et al. | 264/572 |

FOREIGN PATENT DOCUMENTS

| | | | |
|---|---|---|---|
| 438279A1 | 7/1991 | European Pat. Off. | 264/572 |
| 54-34378 | 3/1979 | Japan | 264/572 |
| 1-168425 | 7/1989 | Japan | 264/572 |
| 3-9820 | 1/1991 | Japan | 264/572 |
| 5-84786 | 4/1993 | Japan | 264/572 |
| 5-84764 | 4/1993 | Japan | 264/572 |
| 92/07697 | 5/1992 | WIPO | 264/572 |

*Primary Examiner*—Catherine Timm
*Attorney, Agent, or Firm*—Wenderoth, Lind & Ponack

[57] ABSTRACT

A process for the production of a molded article having a hollow structure, using an injection molding machine equipped with a mold apparatus having a mold provided with a cavity, said process comprising the steps of (a) positioning a plug in its forward end position in the cavity with a plug-moving means before a molten resin is injected, (b) moving the plug toward its backward end position nearly in parallel with a flow-axis direction of the molten resin, with the plug-moving means or under a pressure of the injected molten resin, after the injection of the molten resin is initiated, (c) introducing a pressurized fluid into the molten resin in the cavity through a pressurized fluid introducing portion while the plug is moving, and (d) moving the plug up to its backward end position nearly in parallel with the flow-axis direction of the molten resin with the plug-moving means or under the pressure of the molten resin and/or the pressurized fluid introduced into the molten resin, and then, cooling and solidifying the molten resin in the cavity to form a hollow structure in the resin.

24 Claims, 33 Drawing Sheets

Fig. 1A
INJECTION OF MOLTEN RESIN ———
INTRODUCTION OF PRESSURIZED FLUID ———
MOVEMENT OF PLUG ——

Fig. 1B
INJECTION OF MOLTEN RESIN ———
INTRODUCTION OF PRESSURIZED FLUID ———
MOVEMENT OF PLUG ———

Fig. 1C
INJECTION OF MOLTEN RESIN ———
INTRODUCTION OF PRESSURIZED FLUID ———
MOVEMENT OF PLUG ——

Fig. 1D
INJECTION OF MOLTEN RESIN ———
INTRODUCTION OF PRESSURIZED FLUID ————
MOVEMENT OF PLUG ——

Fig. 1E
INJECTION OF MOLTEN RESIN ———
INTRODUCTION OF PRESSURIZED FLUID ———
MOVEMENT OF PLUG ——

Fig. 1F
INJECTION OF MOLTEN RESIN ———
INTRODUCTION OF PRESSURIZED FLUID ———
MOVEMENT OF PLUG ——

Fig. 2A

INJECTION OF MOLTEN RESIN ———
INTRODUCTION OF PRESSURIZED FLUID ————
MOVEMENT OF PLUG ——

Fig. 2B

INJECTION OF MOLTEN RESIN ————
INTRODUCTION OF PRESSURIZED FLUID ————
MOVEMENT OF PLUG ——

Fig. 2C

INJECTION OF MOLTEN RESIN ———
INTRODUCTION OF PRESSURIZED FLUID ————
MOVEMENT OF PLUG ——

Fig. 2D

INJECTION OF MOLTEN RESIN ———
INTRODUCTION OF PRESSURIZED FLUID ————
MOVEMENT OF PLUG ——

MOLD APPARATUS FOR PROCESS FOR INJECTION MOLDING

BACKGROUND OF THE INVENTION AND RELATED ART

The present invention relates to a mold apparatus suitable for injection-molding an article having a hollow structure, and a process for injection-molding an article having a hollow structure with the mold apparatus. Specifically, it relates to a mold apparatus which can effectively prevent "jetting" (also called "snake flow") in a molten resin injected into a cavity of a mold and is suitable for molding an article having an excellent appearance and a desired hollow structure therein, and a process for injection-molding such an article having a hollow structure with the mold apparatus. More specifically, it relates to a mold apparatus suitable for molding an article having a hollow structure which works, for example, as a path for the flow of a fluid, the hollow structure being a T-letter shaped manifold structure, a cross or "+" shaped manifold structure or a manifold structure for distributing a fluid in multi-directions, and a process for injection-molding an article having such a hollow structure with the mold apparatus.

For producing a molded article of a synthetic resin having a desired hollow structure, an injection molding method has recently increasingly come into wide use in which a pressurized fluid is introduced into a molten resin injected into a cavity of a mold to form a molded article having a hollow structure, since the so-formed article is almost free of a sink mark and distortion. This conventional injection molding method requires the use of a mold and an apparatus for introducing a pressurized fluid. Further, the mold is required to have a sprue portion and a runner portion for flowing a molten resin from a heating cylinder head of an injection molding machine to the cavity of the mold, and a gate portion is provided between the runner portion and the cavity.

An article having a manifold structure having a hollow structure which works as a path for the flow of a fluid is used, for example, as a tubing member, in various fields. An article of this type is used, for example, as a cooling tubing member for an engine, an intake manifold member for an engine, an exhaust gas tubing member or a hydraulic tubing member for a braking device in the fields of automobiles and motorcycles. Further, an article of the above type is used, for example, as a coolant tubing member for a refrigerator or a fluid-controlled actuator tubing member in the fields of electric appliances and machines. It is also used, for example, as a tubing member for a hot-water heater, a tubing member for a boiler, a tubing member for water supply or a tubing member for gas supply in the fields of construction and construction materials, or as a tubing member for a medical apparatus for a circulatory system or a tubing member for a medical apparatus for a respiratory system in the field of medicine.

Generally, the material forming an article having a manifold structure is a metal or a synthetic resin. When an article having a manifold structure is produced, for example, from a metal, a plurality of parts are assembled and welded. When an article having a manifold structure is produced, for example, from a synthetic resin, a plurality of parts are assembled, bonded and welded. For producing an article having a manifold structure by an injection molding method, there is known a method in which a core for forming a hollow structure is placed in a cavity of a mold and a molten resin is injected into a space formed by the cavity surface and the surface of the core. However, the problem of this method is that the mold structure is complicated. Further, there is known another method of forming a manifold structure by an injection molding method, in which a core of a water-soluble resin or a metal for forming a hollow structure is placed in a cavity of a mold, a molten resin is injected into a space formed by the cavity surface and the surface of the core, and then the core is dissolved in water or is removed by melting it. In this method, however, it is required to prepare a core of a water-soluble resin or a metal in advance, and it is required to remove the core after an article is formed, so that the production process is complicated. As explained above, in all the above-explained methods, a number of parts are required, the production process is complicated, an assembly step is required, and it is difficult to reduce the production cost. Further, the method of producing a manifold by the injection molding method with the core involves a problem of weld.

JP-A-6-262636 discloses a method of injection-molding a pipe-shaped article having a plurality of branches. In this injection molding method, no complicated mold structure is required. While a molten resin is injected into a cavity of a mold for producing a branched pipe, a pressurized gas is introduced through branch ends to form a pipe-shaped article. This injection molding method is, in principle, is a method for improving the appearance of an article (overcoming a sink mark and distortion) by introducing a pressurized gas into a molten resin, or a so-called gas-assisted injection molding method.

When an attempt is made to produce a molded article of a synthetic resin having an excellent appearance by a conventional injection molding method, and when the area of the cross-section of the cavity of a mold, which is perpendicular to the flow of a molten resin, is largely different in size from the area of the cross section of a gate portion, jetting takes place in a molten resin injected into the cavity, and the appearance and function of the molded article is greatly impaired to decrease the product value of the article.

For obtaining a molded article of a synthetic resin having improved physical properties such as high strength, high impact strength, high fatigue resistance, high creep resistance, high heat resistance, high hot water resistance, high oil resistance, high chemical resistance, etc., it is required to use a synthetic resin of high melt-viscosity such as a synthetic resin of having high molecular weight, a crosslinkable synthetic resin or a synthetic resin alloy. However, the problem of the use of the above resins is that jetting is liable to occur, so that it is difficult to obtain a desired molded article having an excellent appearance.

The method of introducing a pressurized fluid into a molten resin injected into a cavity of a mold is largely classified into a so-called full shot method in which a pressurized fluid is introduced after the cavity is completely filled with a molten resin and a so-called short shot method in which a pressurized fluid is introduced while the cavity is not completely filled with a molten resin. In particular, the short shot method has a problem in that when a spiral (coil-like) jetting occurs, it is difficult to introduce a pressurized fluid into a molten resin (in an amount insufficient for completely filling the cavity) injected into the cavity, and the pressurized fluid sometimes blows off the molten resin in the cavity so that no desired molded article is obtained.

For preventing the occurrence of jetting, there has been proposed a method in which the cross-sectional area of a gate portion is increased, or the injection rate of a molten resin is decreased, or the temperature of a molten resin is increased, or a resin having a low melt viscosity is selected. However, when the cross-sectional area of a gate portion is increased, it requires an additional cost to post-treat the gate-corresponding portion of the article. When the injection rate is decreased, the molding cycle is long so that the production cost increases. When the temperature of a molten resin is increased, the heat stability of the molten resin is impaired and the molten resin generates a gas or the resin has a decreased molecular weight so that the molded article has a poor appearance or decreased properties. Further, the method of selecting a resin having a low melt viscosity is not an essential solution for obtaining a molded article having high impact strength and high fatigue resistance, since, for these purposes, it is required to use a resin having a high melt viscosity such as a synthetic resin of high molecular weight, a crosslinkable synthetic resin or a synthetic resin alloy.

The injection molding method disclosed in JP-A-6-262636 is very effective for producing a pipe-like article having a plurality of branches. However, a pressurized gas is sometimes not properly introduced into a molten resin, and a molded article having a desired hollow structure is not always obtained. This phenomenon is liable to take place when a synthetic resin having a high melt viscosity or a synthetic resin reinforced with a reinforcing material such as a glass fiber is used. For obtaining a molded article of a synthetic resin having improved physical properties such as high strength, high impact strength, high fatigue resistance, high creep resistance, high heat resistance, high hot water resistance, high oil resistance, high chemical resistance, etc., it is required to select a resin from synthetic resins having a high melt viscosity such as a synthetic resin of high molecular weight, a crosslinkable synthetic resin, resins prepared by incorporating a reinforcing material into these resins, and a synthetic resin alloy. However, when the above resins are used, it is sometimes difficult to obtain a molded article having a desired hollow structure.

OBJECT AND SUMMARY OF THE INVENTION

It is therefore an object of the present invention to provide a mold apparatus suitable for the reliable production of a molded article of a synthetic resin having an excellent appearance and a desired hollow structure in a short and stable molding cycle without any influence caused by the synthetic resin used, and a process for injection molding an article having a hollow structure with the mold apparatus.

The above object and advantages of the present invention are achieved, first, by a mold apparatus having a mold provided with a cavity, for use with an injection molding machine, for producing a molded article having a hollow structure by introducing a pressurized fluid into a molten resin in the cavity while or after the molten resin is injected into the cavity, and cooling and solidifying the molten resin in the cavity to form a hollow structure in the molded article, Said mold apparatus comprising (A) at least one plug which is provided in the cavity of the mold and is movable nearly in parallel with a flow-axis direction of the molten resin, (B) a plug-moving means for moving the plug, (C) a resin injection portion for injecting the molten resin into the cavity, and (D) a pressurized fluid introducing portion for introducing the pressurized fluid into the molten resin injected into the cavity.

In the mold apparatus of the present invention, the surface of the plug which is to contact with a molten resin is preferably smooth-finished. When the contact surface of the plug has a high roughness, it is difficult to separate the contact surface from the solidified resin, and it is therefore difficult to move the plug smoothly, so that it is difficult to obtain an intended molded article.

The form of the plug cannot be uniquely determined, while it can be properly determined on the basis of the properties of a resin used and the form of an intended hollow structure. The plug has such a form that the plug can move in the cavity. For preventing the occurrence of the defects on a molded article surface caused by jetting and a flow mark, the cross-sectional form of the plug in the perpendicular direction to the moving direction of the plug is preferably generally the same as or similar to the cross-sectional form of the cavity in the perpendicular direction. The clearance between the plug surface and the cavity surface is required to be such a clearance that the plug does not contact the cavity surface. Preferably, a molten resin does not penetrate the above clearance, while a molten resin may penetrate the clearance in some cases.

The mold apparatus of the present invention may have a structure in which a sprue portion and a runner portion as a flow path through which the molten resin flows are provided between a heating cylinder end of an injection molding machine and the cavity and a gate portion is provided between the runner portion and the cavity, or may have a structure in which a molten resin is directly injected into the cavity through a hot runner or a valve gate. A whole of the above gate portion, the above hot runner, the above valve gate, etc., is called a resin injection portion. Further, when a molded article varies in thickness, specifically from a thin portion to a thick portion, that portion of a cavity which forms the thin portion of the molded article is included in the resin injection portion when the forward end position of the plug comes close to that portion of the cavity which forms the thin portion.

A pressurized fluid introducing device for introducing a pressurized fluid may be a gas injection nozzle which is provided with at least one non-return valve on its top portion and whose forward end can communicate with the pressurized fluid introducing portion, and apart from that portion with a moving means.

The mold of the present invention may be a mold with which one molded article is produced in one operation or may be a mold with which a plurality of molded articles are produced in one operation.

In one aspect of the mold apparatus of the present invention, when the plug is positioned in its forward end position, the plug is preferably positioned close to the resin injection portion. Although depending upon the form of a molded article, "the plug being positioned close to the resin injection portion" generally means that the top end portion of the plug opposite to the resin injection portion is positioned 0 mm to 20 mm apart from the resin injection portion when the plug is positioned its forward end position. When the plug is positioned in its forward end position, the plug may be positioned so that the top end portion of the plug contacts the cavity surface to shut the resin injection portion. If the plug is positioned in its forward end position but is considerably apart from the resin injection portion, the space formed by the cavity surface and the plug is so large that a molten resin injected into the cavity does not collide with the plug so sufficiently as to be prevented from going forward, and the occurrence of jetting is sometimes not effectively prevented.

The above object and advantages of the present invention are achieved, second, by an injection molding process of the present invention, the first to fourth aspects of which use an injection molding machine equipped with a mold apparatus comprising (A) at least one plug which is provided in the cavity of the mold and is movable nearly in parallel with a flow-axis direction of a molten resin, (B) a plug-moving means for moving the plug, (C) a resin injection portion for injecting the molten resin into the cavity, and (D) a pressurized fluid introducing portion for introducing a pressurized fluid into the molten resin injected into the cavity.

The first aspect of the injection molding process of the present invention is directed to a process for the production of a molded article by introducing the pressurized fluid into the molten resin in the cavity of the mold through the pressurized fluid introducing portion while or after the molten resin is injected into the cavity through the resin injection portion, and cooling and solidifying the resin in the cavity to form a hollow structure in the molded article, said process comprising the steps of (a) positioning the plug in its forward end position in the cavity with the plug-moving means before the molten resin is injected, (b) moving the plug toward its backward end position nearly in parallel with a flow-axis direction of the molten resin, with the plug-moving means or under a pressure of the injected molten resin, after the injection of the molten resin is initiated, (c) introducing the pressurized fluid into the molten resin in the cavity through the pressurized fluid introducing portion while the plug is moving, and (d) moving the plug up to its backward end position nearly in parallel with the flow-axis direction of the molten resin with the plug-moving means or under the pressure of the molten resin and/or the pressurized fluid introduced into the molten resin, and then, cooling and solidifying the molten resin in the cavity to form the hollow structure in the resin.

FIGS. 1A to 1F and FIGS. 2A to 2D schematically show the timing of movement (sliding) of the plug, the timing of injection of the molten resin, and the timing of introduction of the pressurized fluid. In FIGS. 1A to 1F and FIGS. 2A to 2D, the left end of a line segment indicated by "INJECTION OF MOLTEN RESIN" shows the initiation of the injection, and its right end shows the termination of the injection. The left end of a line segment indicated by "INTRODUCTION OF PRESSURIZED FLUID" shows the initiation of the introduction of the pressurized fluid, and its right end shows the termination of the introduction of the pressurized fluid. The left end of a line segment indicated by "MOVEMENT OF PLUG" shows the initiation of the movement of the plug, and its right end shows the termination of the movement of the plug. The length of the line segment schematically shows a period of time.

In the first aspect of the injection molding process of the present invention, as shown in FIGS. 1A and 1B, the pressurized fluid is introduced into the molten resin during the injection of the molten resin into the cavity. Further, as shown in FIGS. 1A and 1B, the movement (sliding) of the plug is initiated after the injection of the molten resin into the cavity is initiated but before the introduction of the pressurized fluid into the molten resin in the cavity is initiated. The movement of the plug to its backward end position may be completed before the injection of the molten resin into the cavity is completed as shown in FIG. 1A, it may be completed after the injection of the molten resin into the cavity is completed as shown in FIG. 1B, or it may be completed at a time when the injection of the molten resin into the cavity is completed.

Otherwise, as shown in FIG. 1C, the pressurized fluid is introduced into the molten resin in the cavity after or at a time when the injection of the molten resin into the cavity is completed, and the movement (sliding) of the plug is initiated before the injection of the pressurized fluid into the cavity is initiated. The movement of the plug to its backward end position is completed after the injection of the molten resin into the cavity is completed and during the introduction of the pressurized fluid into the molten resin as shown in FIG. 1C.

In these cases, the movement (sliding) of the plug may be initiated at a time when the injection of the molten resin into the cavity is initiated, and the introduction of the pressurized fluid may be initiated at a time when the movement of the plug is initiated.

The second aspect of the injection molding process of the present invention is directed to a process for the production of a molded article by introducing the pressurized fluid into the molten resin in the cavity of the mold through the pressurized fluid introducing portion while or after the molten resin is injected into the cavity through the resin injection portion, and cooling and solidifying the resin in the cavity to form a hollow structure in the molded article, said process comprising the steps of (a) positioning the plug in its forward end position in the cavity with the plug-moving means before the molten resin is injected, (b) moving the plug toward its backward end position nearly in parallel with a flow-axis direction of the molten resin, with the plug-moving means or under a pressure of the injected molten resin, after the injection of the molten resin is initiated, and allowing the plug to arrive at its backward end position during the injection of the molten resin or after the injection of the molten resin is completed, (c) introducing the pressurized fluid into the molten resin in the cavity through the pressurized fluid introducing portion, and (d) then, cooling and solidifying the molten resin in the cavity to form the hollow structure in the resin.

FIGS. 1D to 1F schematically show the timing of the movement (sliding) of the plug, the timing of injection of the molten resin, and the timing of introduction of the pressurized fluid in the injection molding process according to the second aspect of the present invention. In the second aspect of the present invention, the pressurized fluid is introduced into the molten resin during the injection of the molten resin into the cavity, as shown in FIG. 1D. Then, after the injection of the molten resin into the cavity is initiated and before the introduction of the pressurized fluid into the molten resin in the cavity is initiated, the movement (sliding) of the plug is initiated. The plug arrives at its backward end position before the introduction of the pressurized fluid into the molten resin is initiated as shown in FIG. 1D.

Otherwise, as shown in FIGS. 1E and 1F, the introduction of the pressurized fluid into the molten resin in the cavity is initiated after or at a time when the injection of the molten resin into the cavity is completed. And, as shown in FIGS. 1E or 1F, the movement (sliding) of the plug is initiated after the injection of the molten resin into the cavity is initiated and before the introduction of the pressurized fluid into the molten resin in the cavity is initiated. The plug arrives at its backward end position before the injection of the molten resin is completed as shown in FIG. 1E, it arrives at its backward end position after the injection of the molten resin is completed as shown in FIG. 1F, or it arrives at its backward end position at a time when the injection of the molten resin is completed.

In these cases, the movement (sliding) of the plug may be initiated at a time when the injection of the molten resin into the cavity is initiated. Further, the injection of the pressurized fluid may be initiated at a time when the plug has arrived at its backward end position.

The third aspect of the injection molding process of the present invention is directed to a process for the production of a molded article by introducing the pressurized fluid into the molten resin in the cavity of the mold through the pressurized fluid introducing portion while the molten resin is injected into the cavity through the resin injection portion, and cooling and solidifying the resin in the cavity to form a hollow structure in the molded article, said process comprising the steps of (a) positioning the plug in its forward end position in the cavity with the plug-moving means before the molten resin is injected, (b) moving the plug toward its backward end position nearly in parallel with a flow-axis direction of the molten resin, with the plug-moving means or under a pressure of the injected molten resin and/or a pressure of the pressurized fluid introduced into the molten resin, while the molten resin is injected into the cavity and while the pressurized fluid is introduced into the molten resin, and allowing the plug to arrive at its backward end position during the introduction of the pressurized fluid, and (c) then, cooling and solidifying the molten resin in the cavity to form the hollow structure in the resin.

FIGS. 2A and 2B schematically show the timing of the movement (sliding) of the plug, the timing of introduction of the molten resin, and the timing of injection of the pressurized fluid in the injection molding process according to the third aspect of the present invention. In the third aspect of the present invention, the introduction of the pressurized fluid into the molten resin is initiated while the molten resin is injected into the cavity as shown in FIGS. 2A and 2B. The movement (sliding) of the plug is initiated after the introduction of the pressurized fluid into the molten resin is initiated as shown in FIGS. 2A and 2B. The plug may arrive at its backward end position before the injection of the molten resin is completed as shown in FIG. 2A, it may arrive at its backward end position after the injection of the molten resin is completed as shown in FIG. 2B, or it may arrive at its backward end position at a time when the injection of the molten resin is completed. In these cases, the movement (sliding) of the plug may be initiated at a time when the introduction of the pressurized fluid into the molten resin is initiated.

The fourth aspect of the injection molding process of the present invention is directed to a process for the production of a molded article by introduction the pressurized fluid into the molten resin in the cavity of the mold through the pressurized fluid introducing portion after the molten resin is injected into the cavity through the resin injection portion, and cooling and solidifying the resin in the cavity to form a hollow structure in the molded article, said process comprising the steps of (a) positioning the plug in its forward end position in the cavity so as to allow the plug to stand against a pressure of the molten resin to be injected, with the plug-moving means before the molten resin is injected, (b) maintaining the plug in its forward end position with the plug-moving means during the injection of the molten resin through the resin injection portion, (c) moving the plug toward its backward end position nearly in parallel with a flow-axis direction of the molten resin, with the plug-moving means or under a pressure of the pressurized fluid, after the injection of the molten resin is completed and after or before the introduction of pressurized fluid is initiated, and allowing the plug to arrive at its backward end position during the introduction of the pressurized fluid, and (d) then, cooling and solidifying the molten resin in the cavity to form the hollow structure in the resin.

FIGS. 2C and 2D schematically show the timing of the movement (sliding) of the plug, the timing of injection of the molten resin, and the timing of introduction of the pressurized fluid in the injection molding process according to the fourth aspect of the present invention. In the fourth aspect of the present invention, the introduction of the pressurized fluid into the molten resin is initiated after (or at a time when) the injection of the molten resin into the cavity is completed as shown in FIGS. 2C and 2D. The movement (sliding) of the plug is initiated after (or at a time when) the introduction of the pressurized fluid into the molten resin is initiated as shown in FIG. 2C, or the movement (sliding) of the plug is initiated after (or at a time when) the injection of the molten resin into the cavity is completed and before the introduction of the pressurized fluid into the molten resin is initiated as shown in FIG. 2D. The plug arrives at its backward end position during the introduction of the pressurized fluid into the molten resin.

In the first to fourth aspects of the injection molding process of the present invention, preferably, the amount of the molten resin injected into the cavity is smaller than the amount which fully fills the cavity, and is sufficient for forming a molded article when the pressurized fluid is introduced into the molten resin.

In one embodiment of the first to fourth aspects of the injection molding process of the present invention, when the plug is positioned in its forward end position, the plug is preferably positioned close to the resin injection portion.

In the mold apparatus or the injection molding process of the present invention, the plug-moving means may be composed of a hydraulic cylinder, a pneumatic cylinder, a hydraulically actuated motor, a pneumatically actuated motor or an electric servo-motor, to directly move (slide) the plug, may be composed of a combination of any one of the above cylinders or motors with a screw mechanism such as a ball screw, a cam mechanism or a rack and pinion mechanism, or may be composed of various springs, while the plug-moving means is preferably composed of a hydraulic cylinder, a pneumatic cylinder, a rack and pinion mechanism or springs. When the plug-moving means is composed of springs, as the springs shrink, the resisting force of the plug to the pressure of the injected molten resin increases. Therefore when the resisting force of the plug is required to be uniform, it is preferred to compose the plug-moving means of a hydraulic cylinder, a pneumatic cylinder or a rack and pinion mechanism.

The resisting force of the plug to the pressure of the injected molten resin cannot be uniquely determined since it depends upon a resin used, the melt viscosity of a resin used, the injection pressure of a resin, the injection rate of a resin, etc. When the plug is moved during the injection of the molten resin, it is required to control the movement of the plug so that part of the plug can form part of the cavity. For example, when a hydraulic or pneumatic cylinder is used, the moving rate of the plug can be easily controlled by controlling the actuation of the cylinder. When other mechanism is employed, the above controlling is carried out.

When a plurality of plugs are used in the present invention, the movement (sliding) of the plugs may be initiated at the same time or at different times, and the plugs may be allowed to arrive at their backward end positions at the same time or at different times, and may be moved at the same moving rate or at different moving rates. The above procedures (timings) may be properly determined depending upon the properties of a resin used and the molding conditions.

The position of the pressurized fluid introducing portion in the mold according to the present invention is not specially limited. The pressurized fluid introducing portion may be provided near the resin injection portion, may be provided far from the resin injection portion, or may be provided in the resin injection portion. The pressurized fluid introducing portion may be provided in the plug in some cases. Further, one pressurized fluid introducing portion may be provided, or a plurality of pressurized fluid introducing portions may be provided. When a plurality of pressurized fluid introducing portions are provided, a partition wall of a resin can be formed within a molded article, and a plurality of hollow structures as paths for the flow of a fluid can be formed within a molded article.

In the mold apparatus of the present invention, and in the fist to fourth aspects of the injection molding process of the present invention, the fluid for the pressurized fluid is preferably a fluid which is in a gaseous or liquid state at room temperature under atmospheric pressure, and which neither reacts with the molten resin nor is mutually mixed with the molten resin. Specific examples of the fluid for the pressurized fluid include gaseous substances at room temperature such as nitrogen gas, carbon dioxide gas, air and helium gas, liquids such as water, and gas which is liquefied under high pressure. Above all, inert gases such as nitrogen gas and helium gas are preferred.

The resin used in the injection molding process of the present invention is not specially limited. The resin includes synthetic resins which can be injection-molded, specifically, thermoplastic resins, thermoplastic elastomers, alloys of these and thermosetting resins. Further, the resin includes mixtures of any one of the above resins with known additives such as a stabilizer, a filler and a fibrous reinforcing material such as a glass fiber. Particularly preferred are thermoplastic resins, thermoplastic elastomers, alloys of these, and mixtures of any one of these with an additive such as a stabilizer, a filler and a fibrous reinforcing material. Specific examples of the above resin include generally used thermoplastic resins such as a polyolefin resin, a polystyrene resin, an ABS resin, an AS resin, a PVC resin, a methacrylic resin and a fluorine-containing resin, and engineering plastics such as a polyamide resin, a saturated polyester resin, a polycarbonate resin, a polyacetal resin, a polysulfone resin and a modified polyphenylene ether resin.

The molded article obtained by the injection molding method of the present invention includes a cylinder, a rod, a straight tube and a curved tube a hollow structure. Further, the form of the molded article includes a T-letter form (see schematic cross-sectional views in FIGS. 28B and 28C), a cross or "+" shaped form (see schematic cross-sectional views in FIG. 17B), a Y-letter form (see a schematic cross-sectional view in FIG. 32A), a U-letter like form in which a tube is branching from the bottom of U-letter (see a schematic cross-sectional view in FIG. 32B), an S-letter like form (see a schematic cross-sectional view in FIG. 32C), and a form having radially extending branches (see a schematic plan view in FIG. 33A and a schematic front view in FIG. 33B). Specific examples of the molded article include parts for an automobile and a motorcycle such as a cooling tubing member for an engine, an intake manifold member of an engine, an exhaust gas tubing member and a hydraulic tubing member for a braking device, parts for electric appliances and machines such as a coolant tubing member for a refrigerator and a fluid-controlled actuator tubing member, parts used in the fields of construction and construction materials such as a tubing member for a hot-water heater, a tubing member for a boiler, a tubing member for water supply, a tubing member for gas supply and a shower head, and parts used in the field of medicine such as a tubing member for a medical apparatus for a circulatory system or a tubing member for a medical apparatus for a respiratory system in the field of medicine. The cross section of the molded article, taken nearly at right angles with the flow-axis direction of the molten resin, may have any form of a circular form, an ellipsoidal form, a square form, a polygonal form and others.

In the present invention, the plug is positioned in its forward end position with the plug-moving means, before the molten resin is injected. By maintaining the plug in its forward end position as described above, the molten resin injected into the cavity collides with the plug so that the molten resin is prevented from flowing straight. As a result, jetting can be effectively prevented, and a molded article having an excellent appearance can be obtained.

Further, the volume of the cavity when the molten resin is injected into the cavity is smaller than the volume of the cavity required for finally forming a molded article. Therefore, even when a synthetic resin having a high melt viscosity is used, the formation of a hollow structure can be reliably initiated by introducing the pressurized fluid into the molten resin in the first to fourth aspects of the injection molding process of the present invention. By finally positioning the plug in its backward end position, the cavity form required for forming the molded article is provided so that a desired hollow structure can be easily and reliably formed in the molded article. By gradually expanding the volume of the cavity by moving the plug backwardly, the flow of the molten resin in the cavity can be controlled and a desired hollow structure can be easily and reliably formed in the molded article.

For producing a molded article having a manifold structure of which the branches have different diameters (as shown in FIG. 28C) or cross sectional forms in hollow structure, the initiation and the completion of movements of the plugs and the moving rates of the plugs are controlled so that the degrees of filling the molten resin in each portion of the cavity forming each branch are easily balanced and the movements of the plugs well synchronize with each other when the pressurized fluid is introduced. Therefore, a hollow structure which works, for example, as a path for the flow of a fluid can be easily and reliably formed in the molded article, and the appearance of the molded article is improved. Another advantage is that no weld occurs. Other effects and advantages of the present invention will be apparent from the following description.

BRIEF DESCRIPTION. OF THE DRAWINGS

The present invention will be explained in detail with reference to drawings hereinafter.

FIGS. 1A to 1F and FIGS. 2A to 2D schematically show the timing of movement (sliding) of the plug, the timing of injection of the molten resin, and the timing of introduction of the pressurized fluid.

DESCRIPTION OF THE PREFERRED EMBODIMENTS

Figure 3:
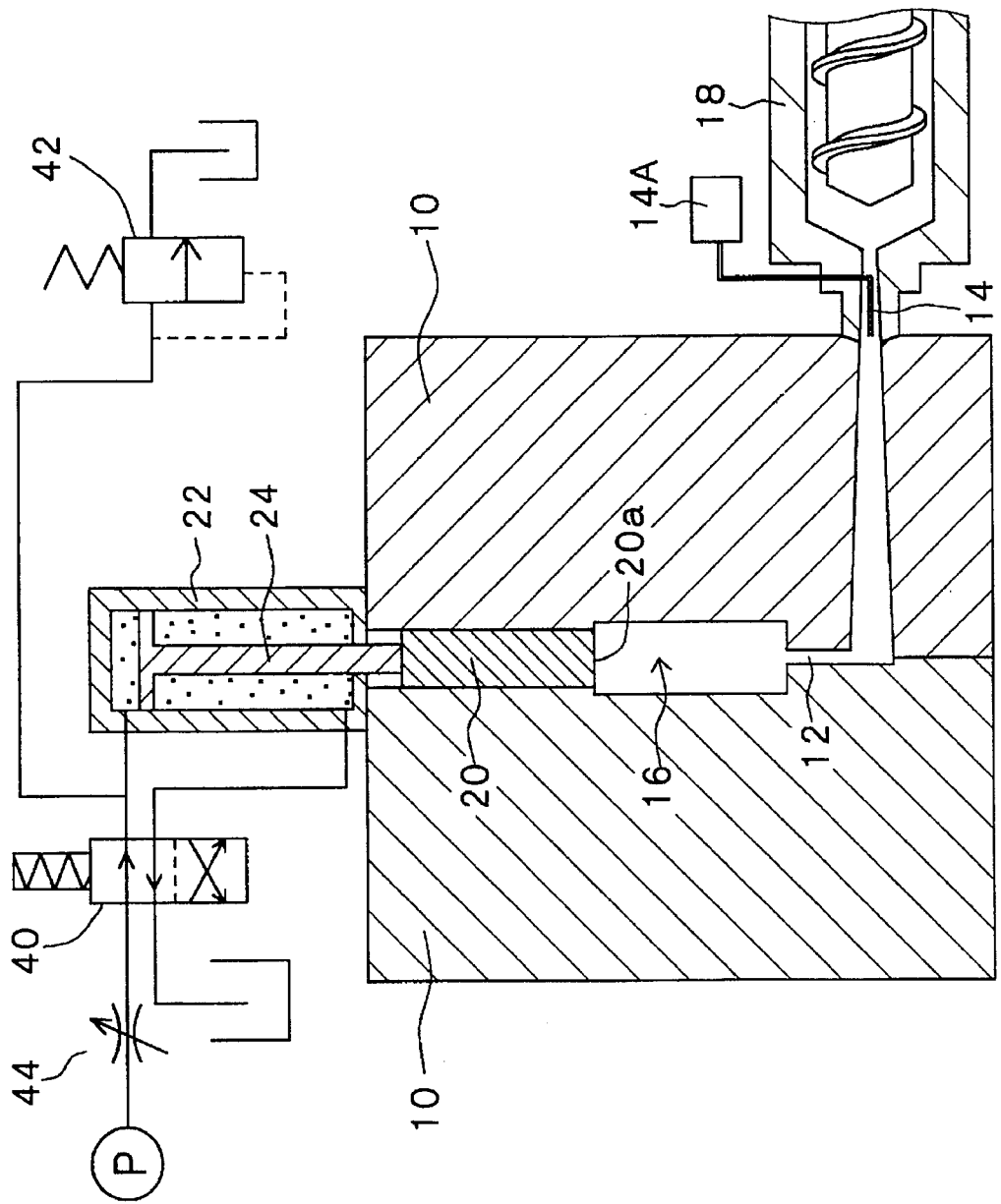
FIG. 3 is a schematic cross section of one preferred embodiment of the mold apparatus of the present invention, in which the plug is in its backward end position.

The present invention will be explained with reference to Examples and drawings hereinafter, while the present invention shall not be limited to these Examples. In Figures, the same reference numeral refers to the same part or component.

Figure 4:
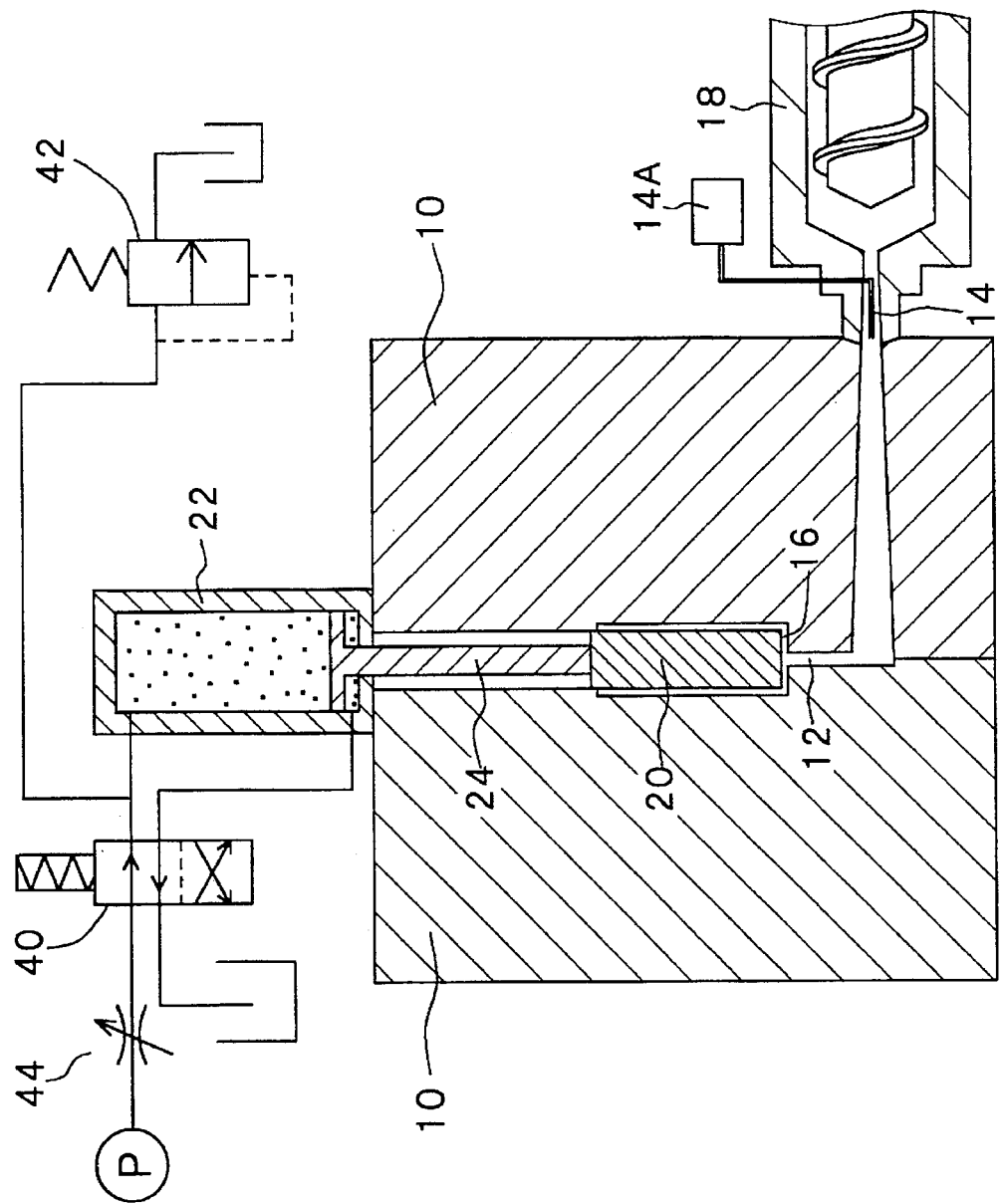
FIG. 4 is a schematic cross section of the same embodiment as that of the mold apparatus of the present invention shown in FIG. 3, in which the plug is in its forward end position.

FIGS. 3 and 4 show schematic cross section of one embodiment of the mold apparatus of the present invention. The mold apparatus shown in FIGS. 3 and 4 has a mold 10 provided with a cavity 16, and is used with an injection molding machine, in which a pressurized fluid is introduced into a molten resin in the cavity 16 while or after the molten resin is injected into the cavity 16, and the molten resin is cooled and solidified in the cavity 16 to form a molded article having a hollow structure. The mold apparatus at least has at least one plug 20, which is provided in the cavity 16 and is movable nearly in parallel with the flow-axis direction of the molten resin, and a plug-moving means 22 for moving the plug 20. Further, the mold apparatus has a resin injection portion 12 for injecting a molten resin into the cavity 16 and a pressurized fluid introducing portion 14 for introducing a pressurized fluid into the molten resin injected into the cavity 16. The plug 20 has a contact surface 20A (see FIG. 3) which is brought into contact with the molten resin. The contact surface 20A is generally plated with hard chromium and mirror-finished so that it has a central line average roughness of 0.1 S or less. The plug 20 may be formed. e.g., from the same material as that of the mold 10. The plug 20 in FIG. 3 is in its backward end position, and the plug 20 in FIG. 4 is in its forward end position. The plug 20 in its forward end position is close to the resin injection portion 12, and is positioned facing the resin injection portion 12.

The mold apparatus shown in FIGS. 3 and 4 is provided with one plug 20 and one plug-moving means 22. The plug 20 is connected to the plug-moving means 22 with a connecting rod 24 which is movable by the actuation of the plug-moving means 22. The plug-moving means 22 is composed of, for example, a pneumatic cylinder which works, e.g., with compressed air. Reference numeral 40 indicates a solenoid for loading the pressure of compressed air on the plug-moving means 22, reference numeral 42 indicates a pressure control valve, reference numeral 44 indicates a flow control valve for controlling the moving rate of the plug 20, and the actuation of the plug-moving means 22 is controlled by the solenoid 40, the pressure control valve 42 and the flow control valve 44.

In FIGS. 3 and 4, reference numeral 18 is a cylinder of an injection molding machine. The mold apparatus shown in FIGS. 3 and 4 has a structure in which a molten resin is injected into the cavity 16 from the cylinder 18 of the injection molding machine through the resin injection portion 12.

In FIGS. 3 and 4, reference numeral 14A is a pressurized fluid introducing device. The mold apparatus shown in FIGS. 3 and 4 has a structure in which a pressurized fluid is introduced into a molten resin in the cavity 16 from the pressurized fluid introducing device 14A through the pressurized fluid introducing portion 14 after or while the molten resin is injected into the cavity 16 from the cylinder 18 of an injection molding machine through the resin injection portion 12. The form of the cavity 16 of the mold 10 defines the outer form of a molded article. On the other hand, the cavity 16 may be designed to allow a molded article to have a extended portion extending from the form of the molded article. In this case, the resin injection portion 12 and the pressurized fluid introducing portion 14 can be provided in that portion of the cavity which corresponds to the extended portion. And, the length of the extended portion from the molded article can be properly determined. The mold apparatus shall not be limited to the above structure, and can be properly design-changed as required.

When the mold apparatus shown in FIGS. 3 and 4 is used, there can be produced a molded article having a hollow structure such as a cylinder or a square pillar having a hollow structure.

Figure 5:
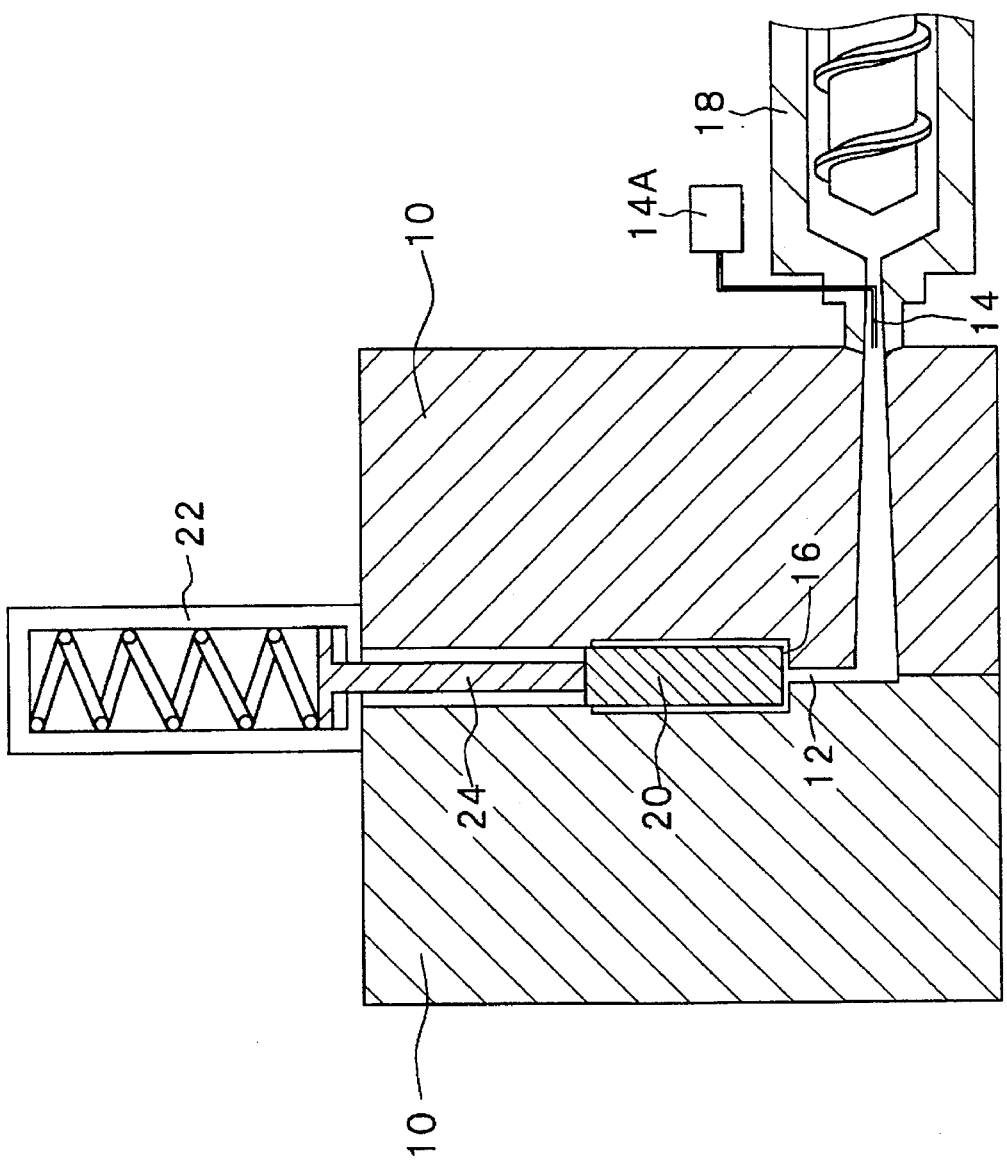
FIG. 5 is a schematic cross section of one preferred embodiment of the mold apparatus of the present invention in which the plug-moving means is composed of a spring.
Figure 6:
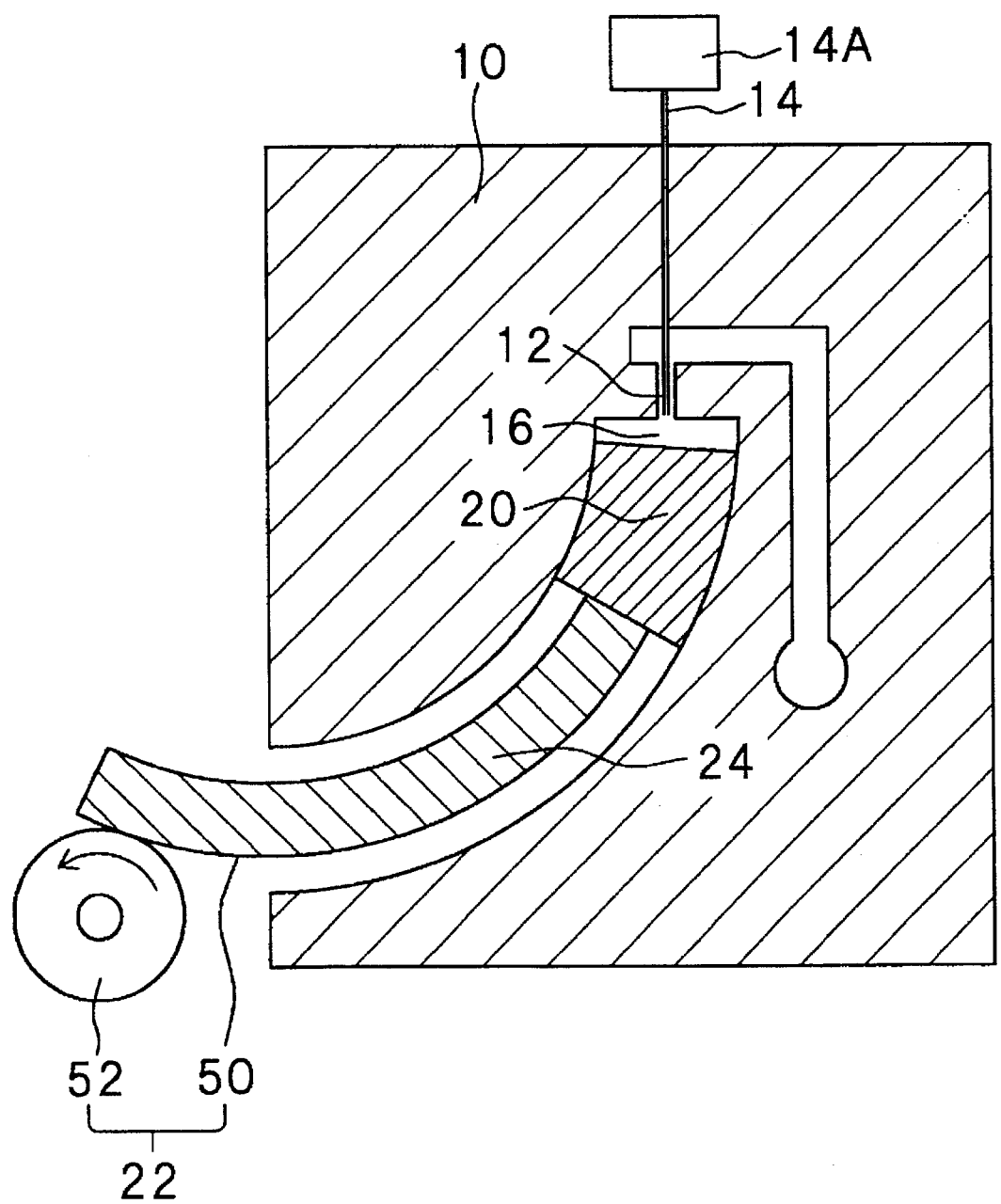
FIG. 6 is a schematic cross section of one preferred embodiment of the mold apparatus of the present invention in which the plug-moving means is composed of a rack and a pinion mechanism.
Figure 7:
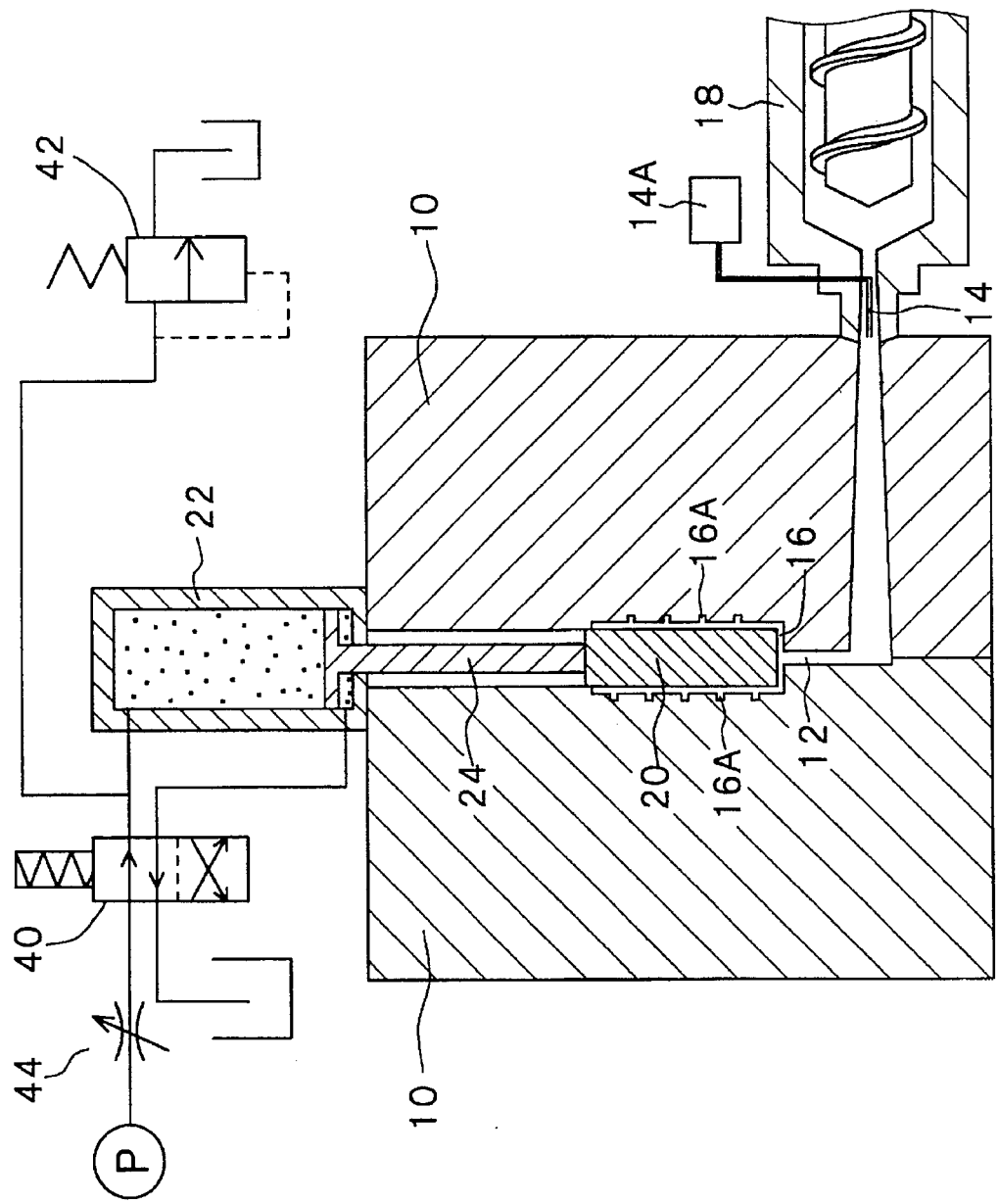
FIG. 7 is a schematic cross section of one preferred embodiment of the mold apparatus of the present invention for forming a helically threaded portion on an outer surface of a molded article.

FIGS. 5, 6 and 7 show schematic cross sections of other embodiments of the mold apparatus of the present invention.

FIG. 5 shows a mold apparatus similar to the mold apparatus shown in FIG. 3, and the mold apparatus shown in FIG. 5 has a plug-moving means 22 composed of a spring.

FIG. 6 shows a mold apparatus having a plug-moving means 22 composed of a rack and pinion mechanism having a rack 50 and a pinion gear 52. The toothed portions of the rack 50 and the pinion gear 52 are omitted. One end of the rack 50 is connected to a connecting rod 24. The pinion gear 52 is rotated with a motor (not shown), and when the pinion gear 52 is rotated, the connecting rod 24 connecting the rack 50 and a plug 20 are moved. The above mold structure enables the production of a curved tube having an arc form. FIG. 6 omits a cylinder 18 of an injection molding machine.

A molded article may have an outer surface formed to have a design or a functional portion thereon. In a mold apparatus shown in FIG. 7, the cavity surface of a cavity 16 has a concave portion 16A so that a molded article has an outer surface having a spiral threaded portion. In this case, it is preferred that the outer diameter of a plug 20 be smaller than the diameter of a bottom portion of the threaded portion of the molded article, that the length of the plug 20 be greater than the length of the threaded portion as a whole, and that the movement distance of the plug 20 be greater than the length of the threaded portion as a whole.

FIGS. 8A, 8B, 9 and 10 show schematic cross sections of other embodiments of the mold apparatus of the present invention. In these Figures, a cylinder 18 and a pressurized fluid introducing device 14A are omitted. In the mold apparatus shown in these Figures, a pressurized fluid introducing portion 14 is provided apart from a resin injection portion 12. The pressurized fluid introducing device may be, for example, a gas ejection nozzle equipped with a non-return valve. A cavity 16 is designed such that a molded article has a extended portion extending from the molded article, and the resin injection portion 12 and the pressurized fluid introducing portion 14 are provided in that portion of the cavity which corresponds to the above extended portion.

Figure 8A:
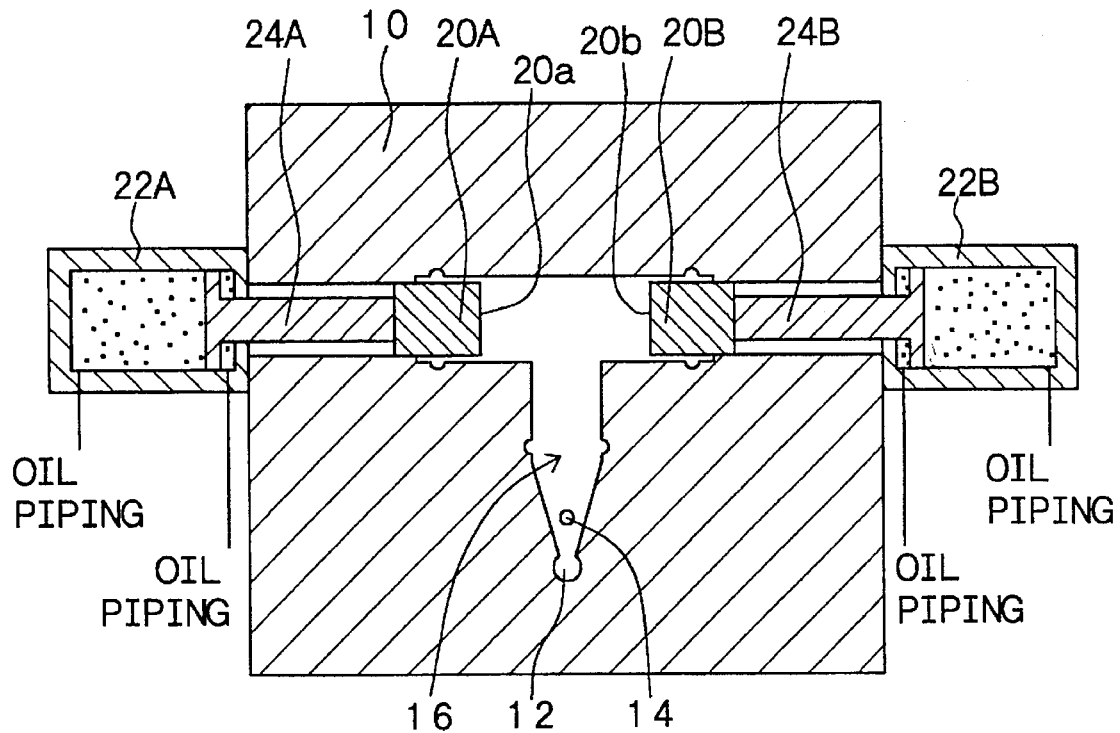
FIGS. 8A and 8B are schematic cross sections of one preferred embodiment of the mold apparatus of the present invention for producing a molded article having a T-letter shaped manifold structure.

The mold apparatus shown in FIG. 8A has two plugs 20A and 20B and two plug-moving means 22A and 22B. The mold apparatus shown in FIG. 8B has one plug 20 and one plug-moving means 22. The mold apparatus shown in FIGS. 9 and 10 have three plugs 20A, 20B and 20C and three plug-moving means 22A, 22B and 22C, and the plugs are connected to the corresponding plug-moving means with connecting rods 24A, 24B and 24C which are movable by the actuation of the corresponding plug-moving means 22A, 22B and 22C. The plug-moving means is composed, e.g., of a hydraulic cylinder which works under an oil pressure.

Figure 8B:
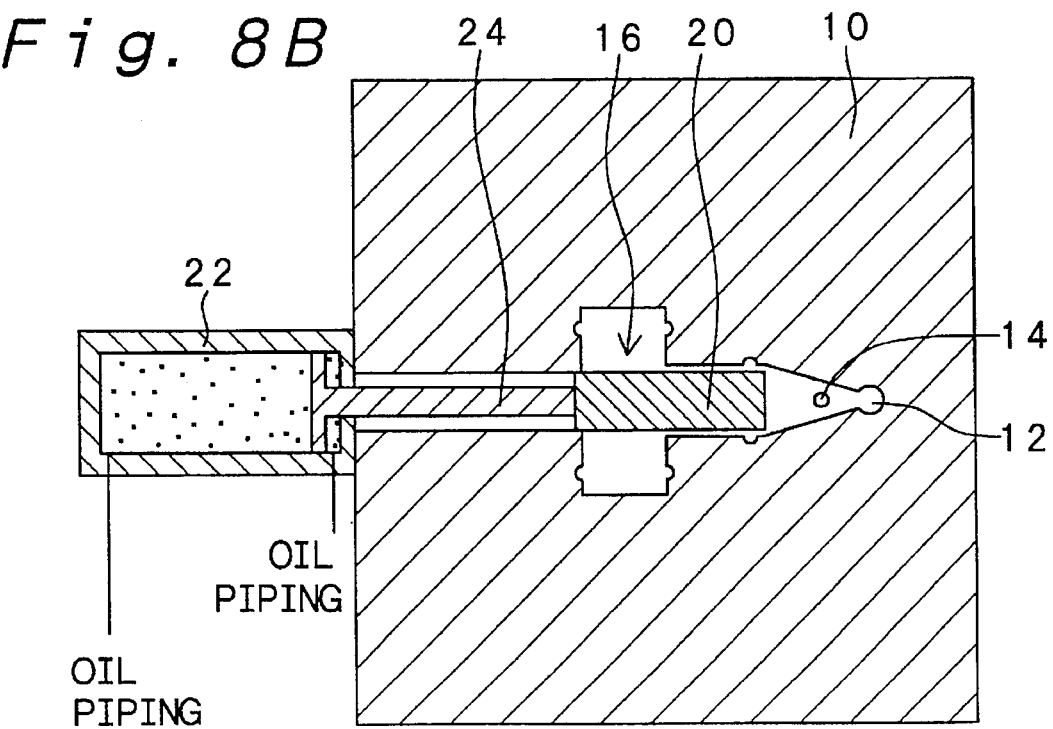
Figure 9:
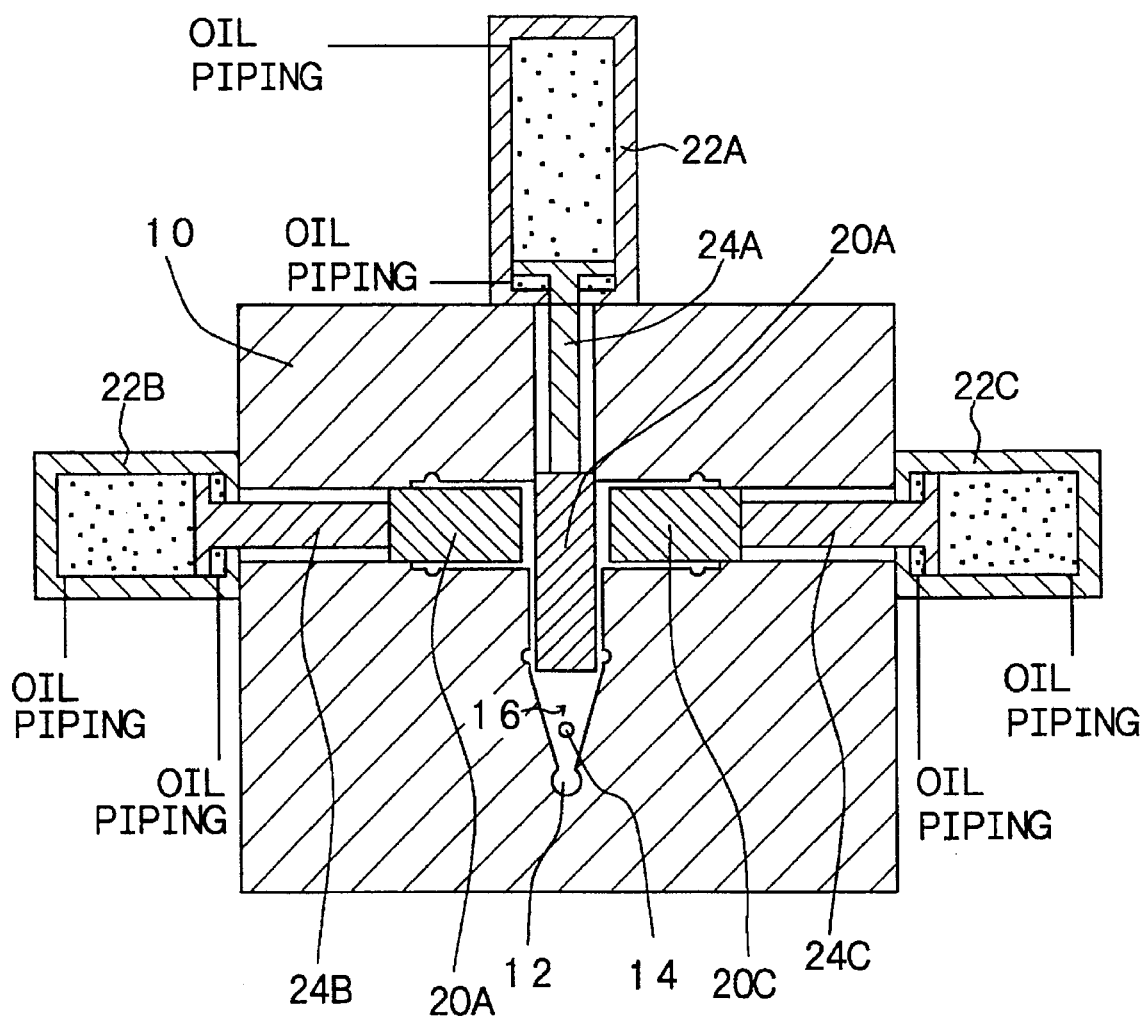
FIG. 9 is a schematic cross section of another preferred embodiment of the mold apparatus of the present invention for producing a molded article having a T-letter shaped manifold structure.
Figure 10:
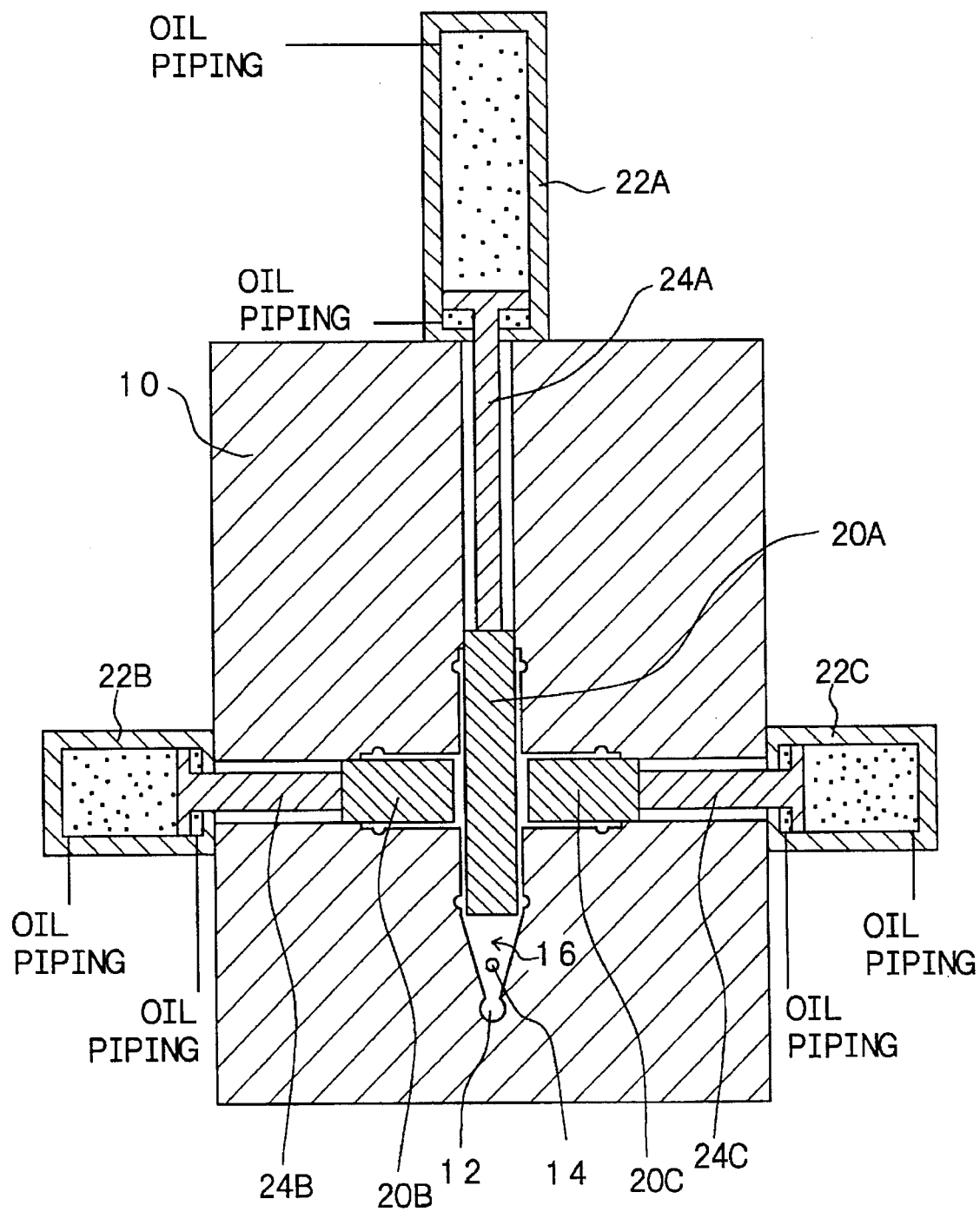
FIG. 10 is a schematic cross section of one preferred embodiment of the mold apparatus of the present invention for producing a molded article having a cross or "+" shaped manifold structure.
Figure 28A:
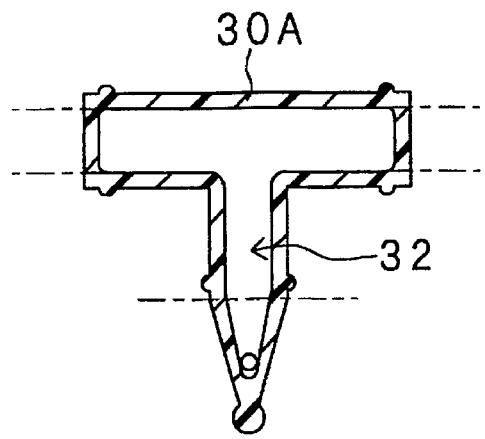
FIGS. 28A to 28C are schematic cross sections of molded articles produced in Example 4.
Figure 28B:
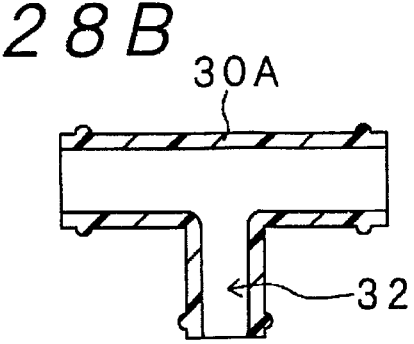
Figure 28C:
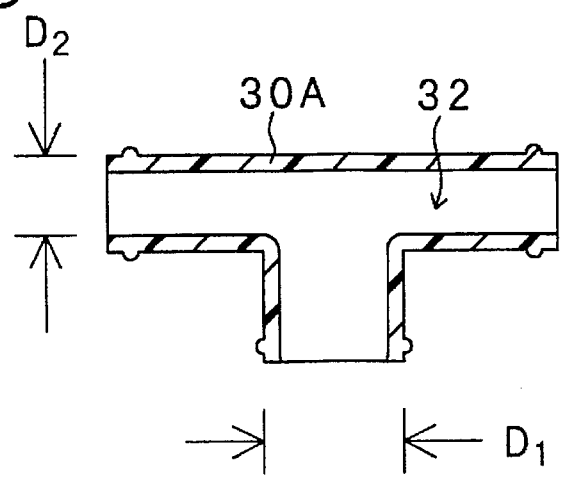

When the mold apparatus shown in FIGS. 8A, 8B and 9 are used, molded articles having a T-letter shaped manifold structure shown in FIGS. 28B and 28C can be produced. The molded articles have a T-letter shaped hollow structure 32, e.g., as a path for the flow of a fluid. When the mold shown in FIG. 10 is used, a molded article having a cross or "+" shaped hollow structure shown in FIG. 17B can be produced. The molded article has a cross or "+" shaped hollow structure 32, e.g., as a path for the flow of a fluid.

Figure 11:
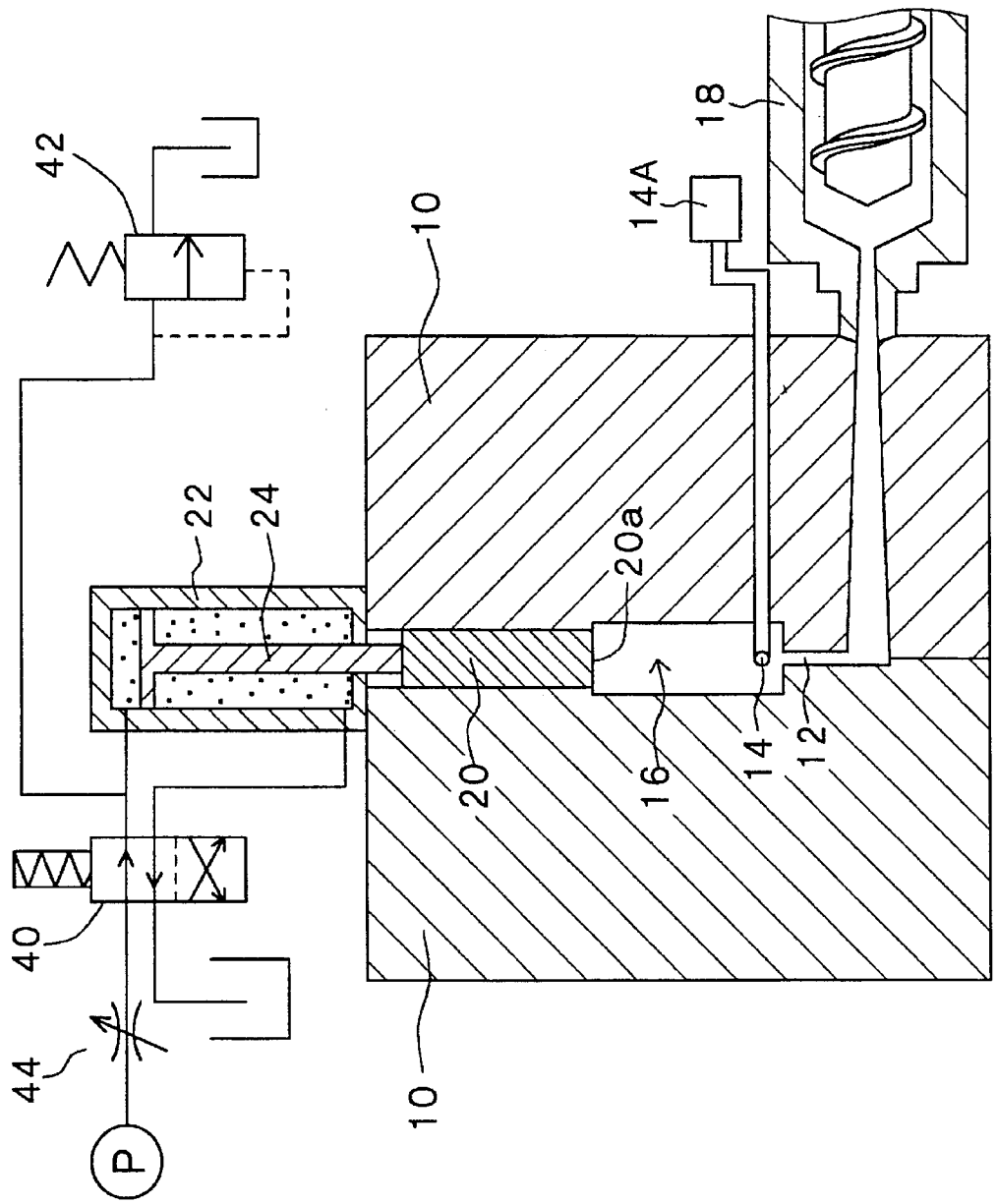
FIG. 11 is one variation of the mold apparatus shown in FIG. 3.

In the mold apparatus shown in FIGS. 3 and 4, the pressurized fluid introducing portion 14 and the resin injection portion 12 are provided substantially in the same place. In a mold apparatus shown in FIG. 11, a pressurized fluid introducing portion 14 and a resin injection portion 12 are provided in different places in the mold apparatus.

The injection molding process of the present invention will be specifically explained with reference to Examples hereinafter.

EXAMPLE 1

Figure 17A:
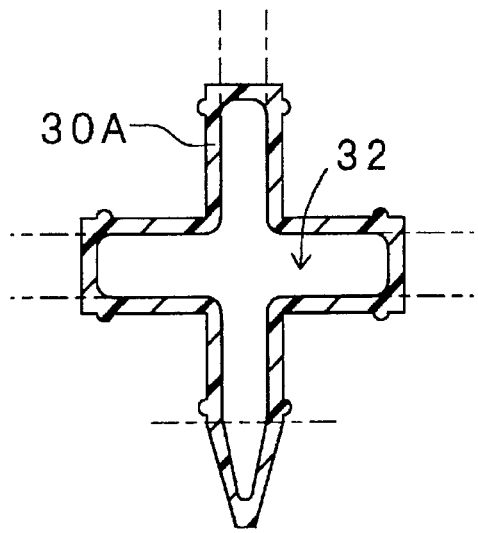
FIG. 17 is a schematic cross section of a molded article produced in Example 1.
Figure 17B:
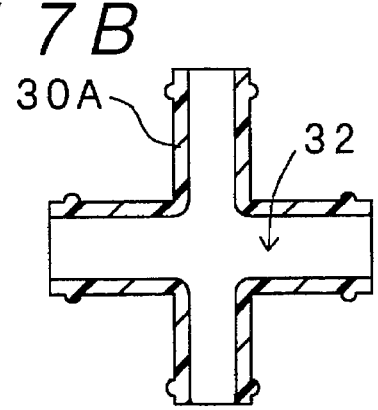

Example 1 relates to the first aspect of the injection molding process of the present invention, and uses the mold apparatus shown in FIG. 10 for producing a molded article having a cross or "+" shaped hollow structure. The molded article has a cross or "+" shaped hollow structure 32 which works, e.g., as paths for the flow of a fluid, as shown in FIG. 17B. In Example 1, after the completion of the injection of a molten resin 30 from the resin injection portion 12 into the cavity 16, a pressurized fluid is introduced from the pressurized fluid introducing portion 14 into the molten resin 30 in the cavity 16. The molten resin is then cooled and solidified in the cavity 16 to form a molded article of the resin 30A having the hollow structure 32. In Example 1, during the injection of the molten resin 30, the plug 20A is moved nearly in parallel with the flow-axis direction of the molten resin 30 toward its backward end position. Further, while the plugs 20A, 20B and 20C are moved, the pressurized fluid is injected into the molten resin 30 in the cavity 16, and finally, the plugs 20A, 20B and 20C are moved nearly in parallel with the flow-axis direction of the molten resin 30 and arrive at their backward end positions during the introduction of the pressurized fluid.

The injection molding process in Example 1 will be explained hereinafter with reference to FIGS. 10 and 12 to 16 which show schematic cross sections of a mold apparatus, etc., FIG. 1C which is a timing chart and FIG. 17 which shows a schematic cross section of a molded article. In FIGS. 12 to 16, the cylinder of an injection molding machine, the pressurized fluid introducing device, the solenoid, the pressure control valve, etc., are omitted.

Each of the plug-moving means 22A, 22B and 22C was composed of a hydraulic cylinder having a piston diameter of 30 mm, which was to work hydraulically. The distance of movement (sliding) of the plug 20A was set at 100 mm. The distance of movement (sliding) of each of the plugs 20B and 20C was set at 50 mm. A polyphenylene sulfide resin (trade name "NOVAPPS 704G40", glass fiber-reinforced grade, supplied by Mitsubishi Engineering-Plastics Corp.) was plasticized and melted in the cylinder of the injection molding machine (not shown) at 320° C. The mold temperature was set at 130° C.

First, the mold 10 was clamped, and then the plugs 20A, 20B and 20C were allowed to stand in their forward end positions against the pressure of a molten resin to be injected, with the plug-moving means 22A, 22B and 22C before the molten resin was injected (see FIG. 10). Each of the plug-moving means 22A, 22B and 22C, each of which was composed of a hydraulic cylinder, was provided with an oil pressure of 100 kgf/cm$^2$ as a resisting force against the pressure of the molten resin to be injected.

Figure 12:
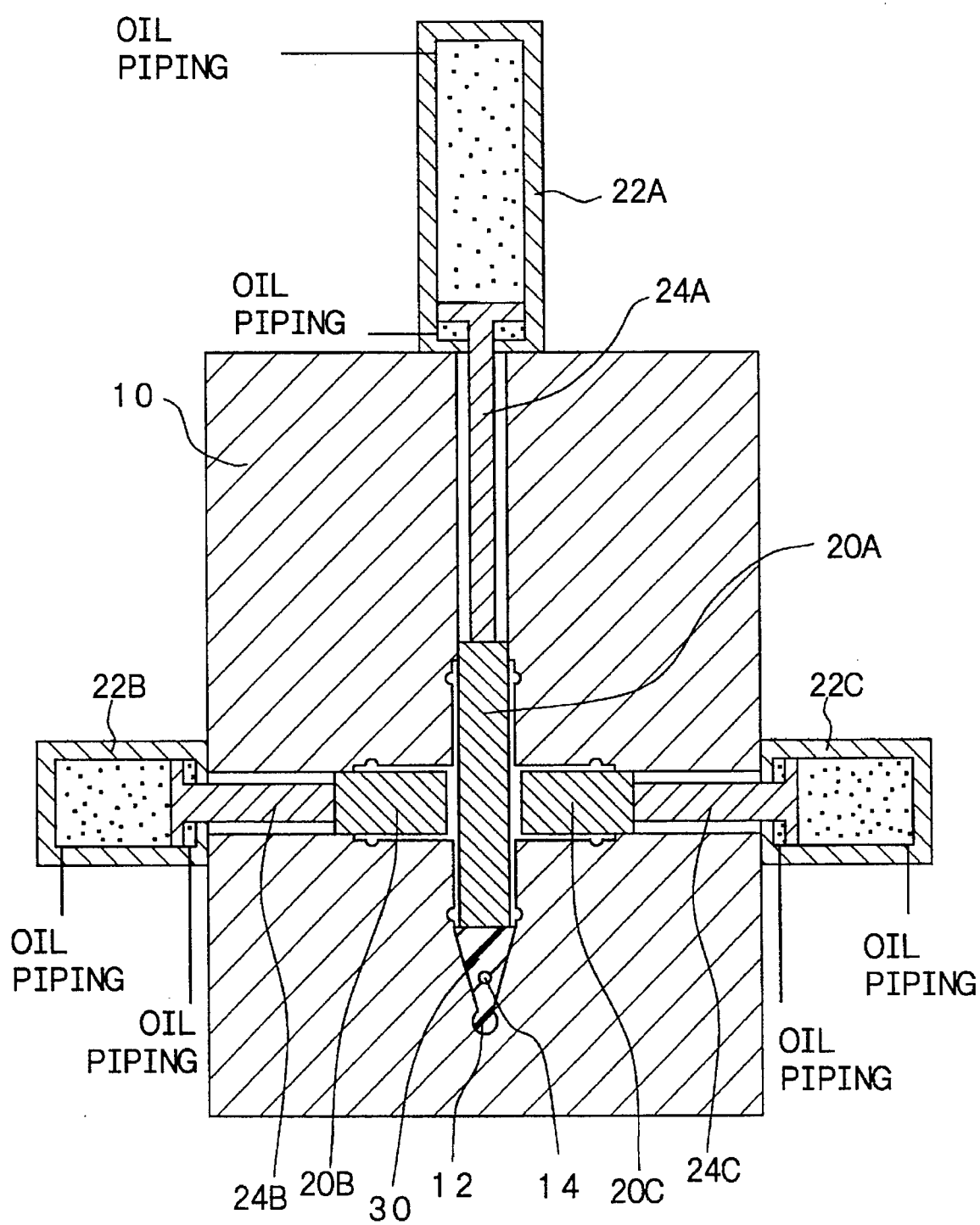
FIG. 12 is a schematic cross section of a mold apparatus, etc., for the explanation of a step of the injection molding process in Example 1.

Then, the molten resin 30 was injected into the cavity 16 through the resin injection portion 12 provided in the mold 10 (see FIG. 12). The injection pressure was set at 500 kgf/cm$^2$, and the injection rate was set at 70 cm$^3$/second. Immediately after the initiation of the injection of the molten resin 30 into the cavity 16, the plug-moving means 22A was actuated to move the plug 20A nearly in parallel with the flow-axis direction of the molten resin toward its backward end position. The plugs 20B and 20C were maintained in their forward end positions with the plug-moving means 22B and 22C. After the plug 20A moved at a predetermined distance, the movement of the plugs 20B and 20C toward their backward end positions was initiated with the plug-moving means 22B and 22C.

Figure 13:
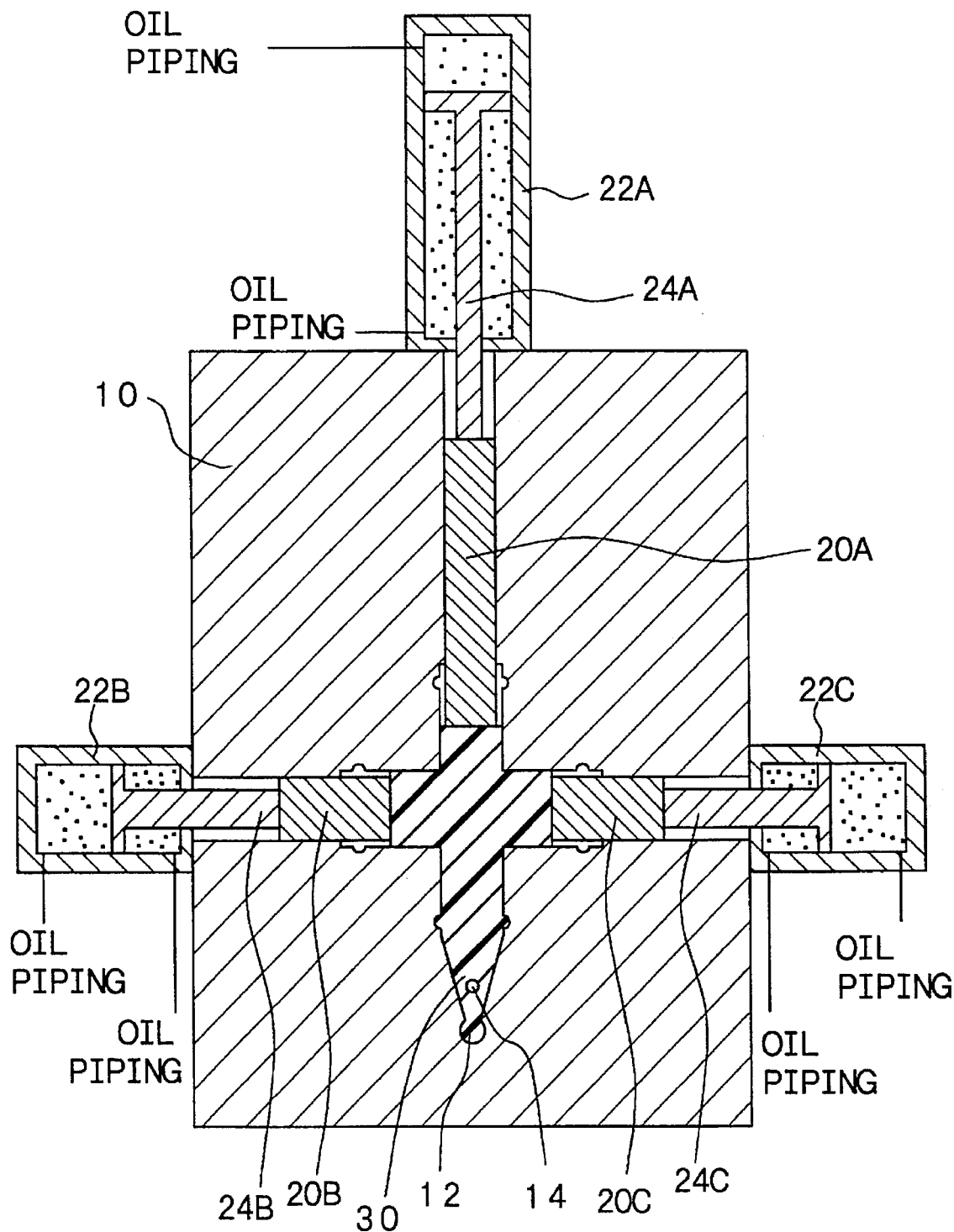
FIG. 13 is also a schematic cross section of a mold apparatus, etc., for the explanation of a step subsequent to the step of the injection molding process in Example 1 shown in FIG. 12.
Figure 14:
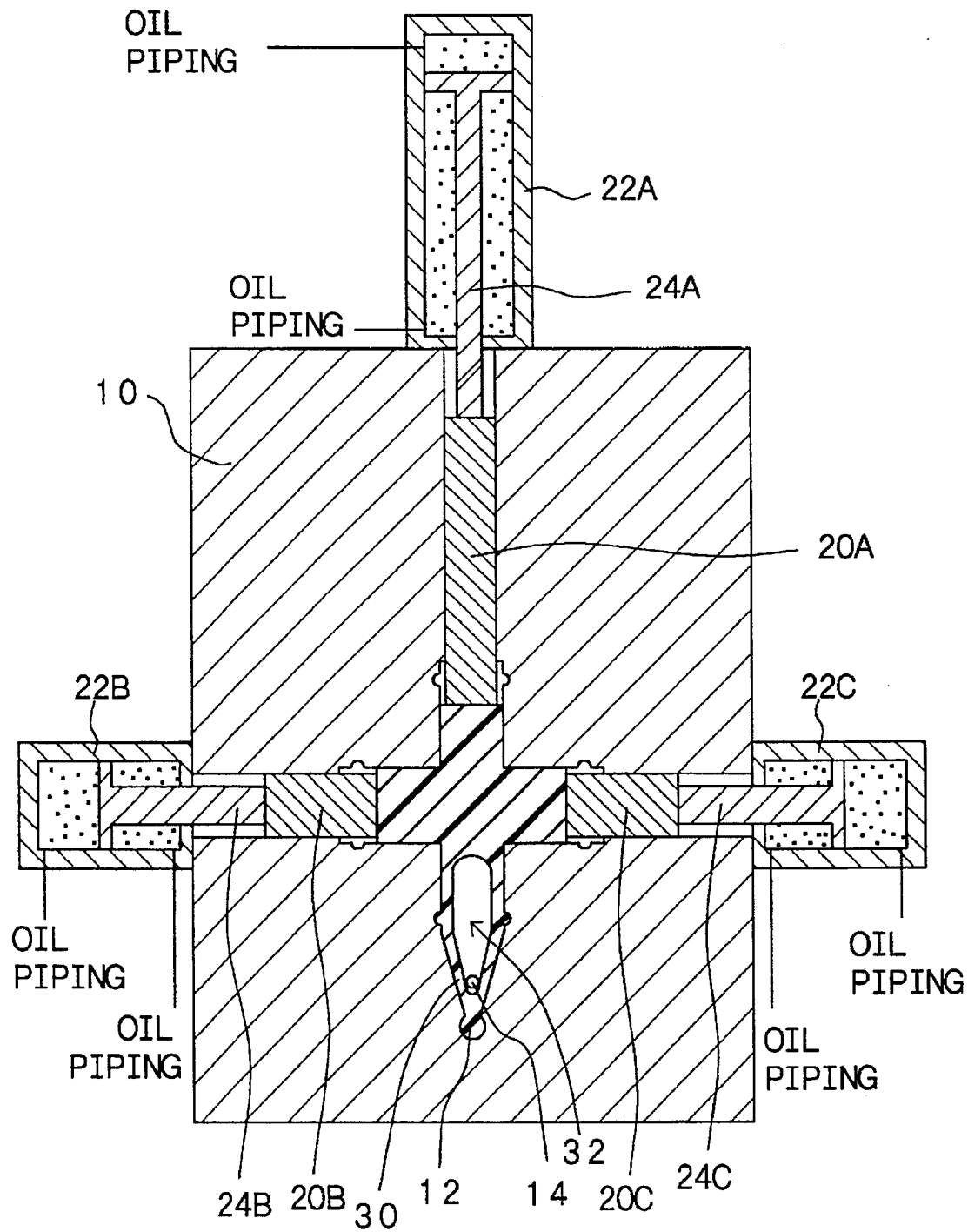
FIG. 14 is also a schematic cross section of a mold apparatus, etc., for the explanation of a step subsequent to the step of the injection molding process in Example 1 shown in FIG. 13.
Figure 15:
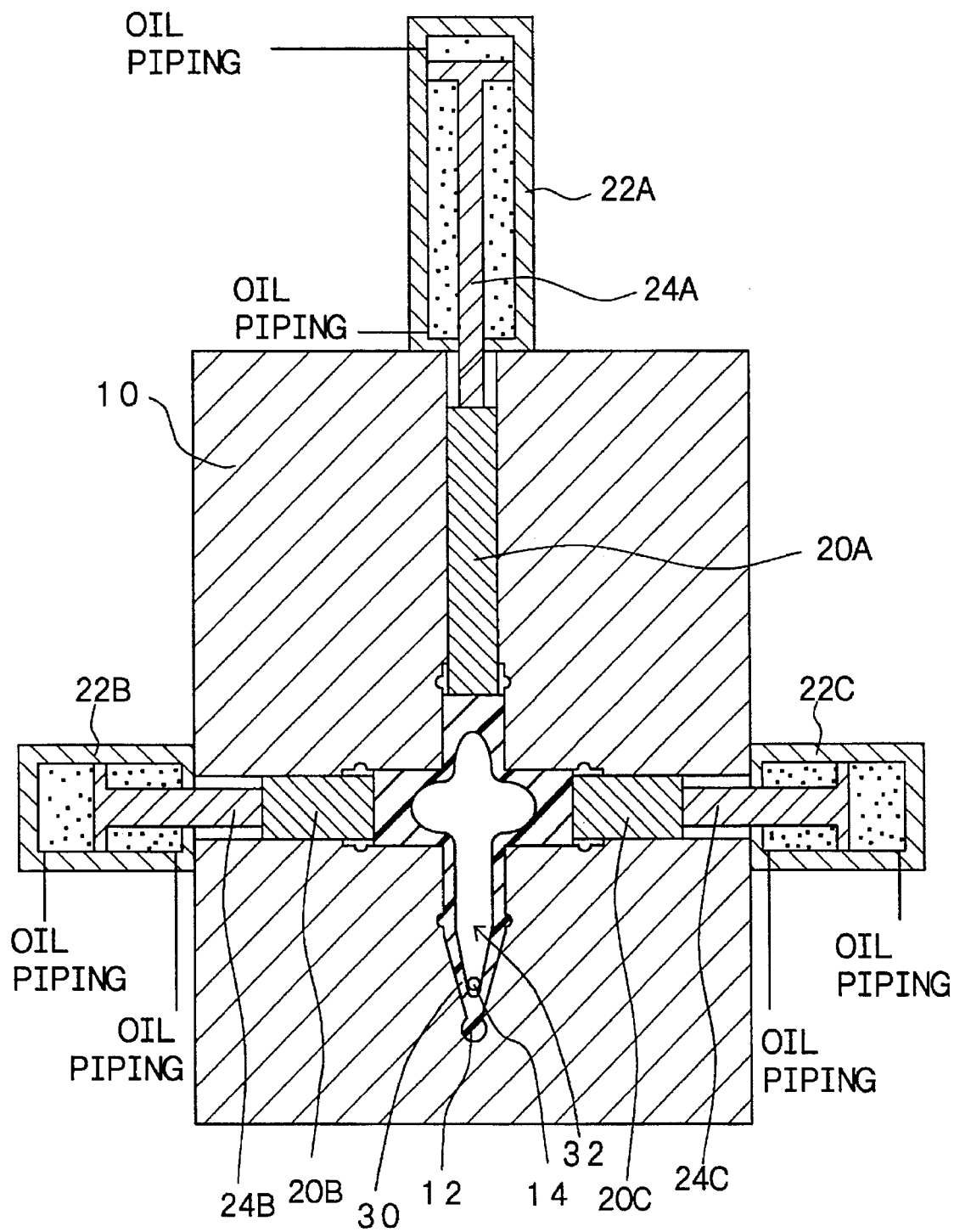
FIG. 15 is also a schematic cross section of a mold apparatus, etc., for the explanation of a step subsequent to the step of the injection molding process in Example 1 shown in FIG. 14.
Figure 16:
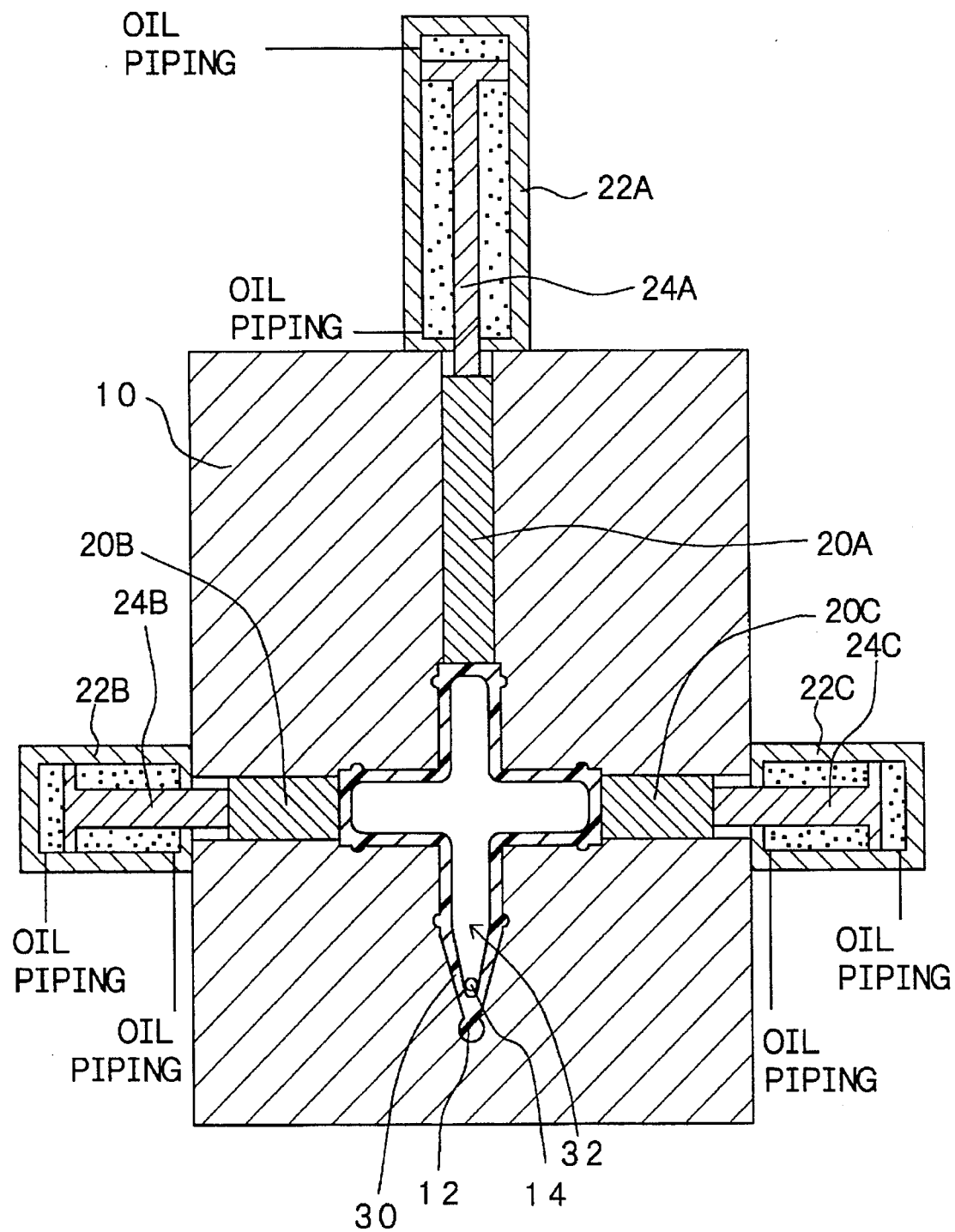
FIG. 16 is also a schematic cross section of a mold apparatus, etc., for the explanation of a step subsequent to the step of the injection molding process in Example 1 shown in FIG. 15.

The injection of the molten resin 30 into the cavity 16 was continued, and when the plug 20A was moved back at a distance of 70 mm and when the plugs 20B and 20C were moved back at a distance of 25 mm (1.6 seconds after the injection of the molten resin was initiated) as shown in FIG. 13, the injection of the molten resin was completed. Immediately after the completion of the injection of the molten resin, a pressurized fluid which was a compressed nitrogen gas having a pressure of 100 kgf/cm$^2$ was introduced into the molten resin 30 through the pressurized fluid introducing portion 14, and at the during the introduction of the pressurized fluid, the plugs 20A, 20B and 20C were moved with the plug-moving means 22A, 22B and 22C (see FIGS. 14 and 15) until these plugs arrived at their backward end positions (see FIG. 16). As a result, a hollow structure 32 was formed in the molten resin 30.

Figure 17C:
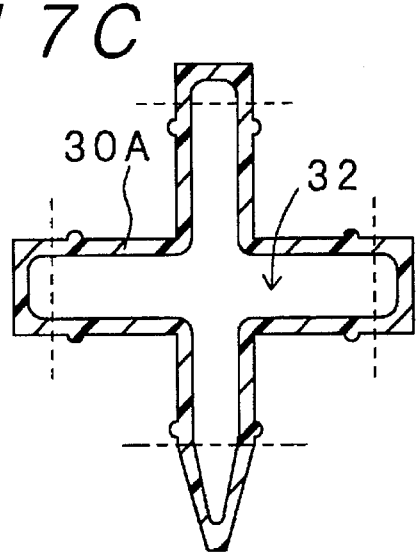

The pressurized fluid was maintained under a predetermined pressure for 70 seconds in the dwell period, and further, the molten resin was cooled for 20 seconds. Then, the pressurized fluid in the hollow structure 32 was released to atmosphere through the pressurized fluid introducing portion 14. Then, the mold was opened, and a molded article was taken out. FIG. 17A shows a schematic cross section of the molded article. Portions indicated by chain lines in FIG. 17A were removed to give a molded article formed of the resin 30A as a product as shown in FIG. 17B. The molded article had a cross or "+" shaped manifold structure. The molded article had a cross or "+" shaped hollow structure 32, e.g., as a path for the flow of a fluid and had an excellent appearance. When the plugs 20A, 20B and 20C are moved until they are out of that portion of the cavity 16 which defines the outer form of the molded article, then, a molded article shown in FIG. 17C is obtained. When the extended portions indicated by chain lines in FIG. 17C are removed, the hollow structure 32, e.g., as a path for the flow of a fluid, can be reliably and easily formed.

COMPARATIVE EXAMPLE 1

A molded article having a cross or "+" shaped manifold structure was produced in the same manner as in Example 1 except that the plugs 20A, 20B and 20C were positioned in their backward end positions from the beginning. As a result, jetting occurred in a molten resin injected into the cavity of the mold, and the molded article had no desired hollow structure.

EXAMPLE 2

Example 2 also relates to the first aspect of the injection molding process of the present invention, and uses a mold apparatus shown in FIGS. 3 and 4 for producing a cylindrical molded article having a hollow structure 32.

The injection molding process in Example 2 will be explained hereinafter with reference to FIGS., 4 and 18 to 21 which show schematic cross sections of a mold apparatus, etc., and FIG. 1C which is a timing chart. In FIGS. 18 to 21, the cylinder of an injection molding machine, the pressurized fluid injection device, the solenoid, the pressure control valve, etc., are omitted.

The plug-moving means 22 was composed of a pneumatic cylinder having a piston diameter of 30 mm, which was to work with compressed air. The distance of movement of the plug 20 was set at 200 mm. A polyacetal resin having a high molecular weight (trade name "Iupital F10", natural color, supplied by Mitsubishi Engineering-Plastics Corp.) was plasticized and melted in the cylinder 18 of an injection molding machine (see FIG. 4) at a resin temperature of 200° C. The mold temperature was set at 30° C. In FIG. 4, the molten resin in the cylinder 18 is omitted.

First, the mold 10 was clamped, and then, before the injection of a molten resin, the plug 20 was positioned in its forward end position in the cavity 16 with the plug-moving means 22 (see FIG. 4). The plug-moving means 22, which was composed of a pneumatic cylinder, was provided with a compressed air pressure of 5 kgf/cm². The fluid control pressure of the pressure control valve 42 was set at 7 kgf/cm².

Figure 18:
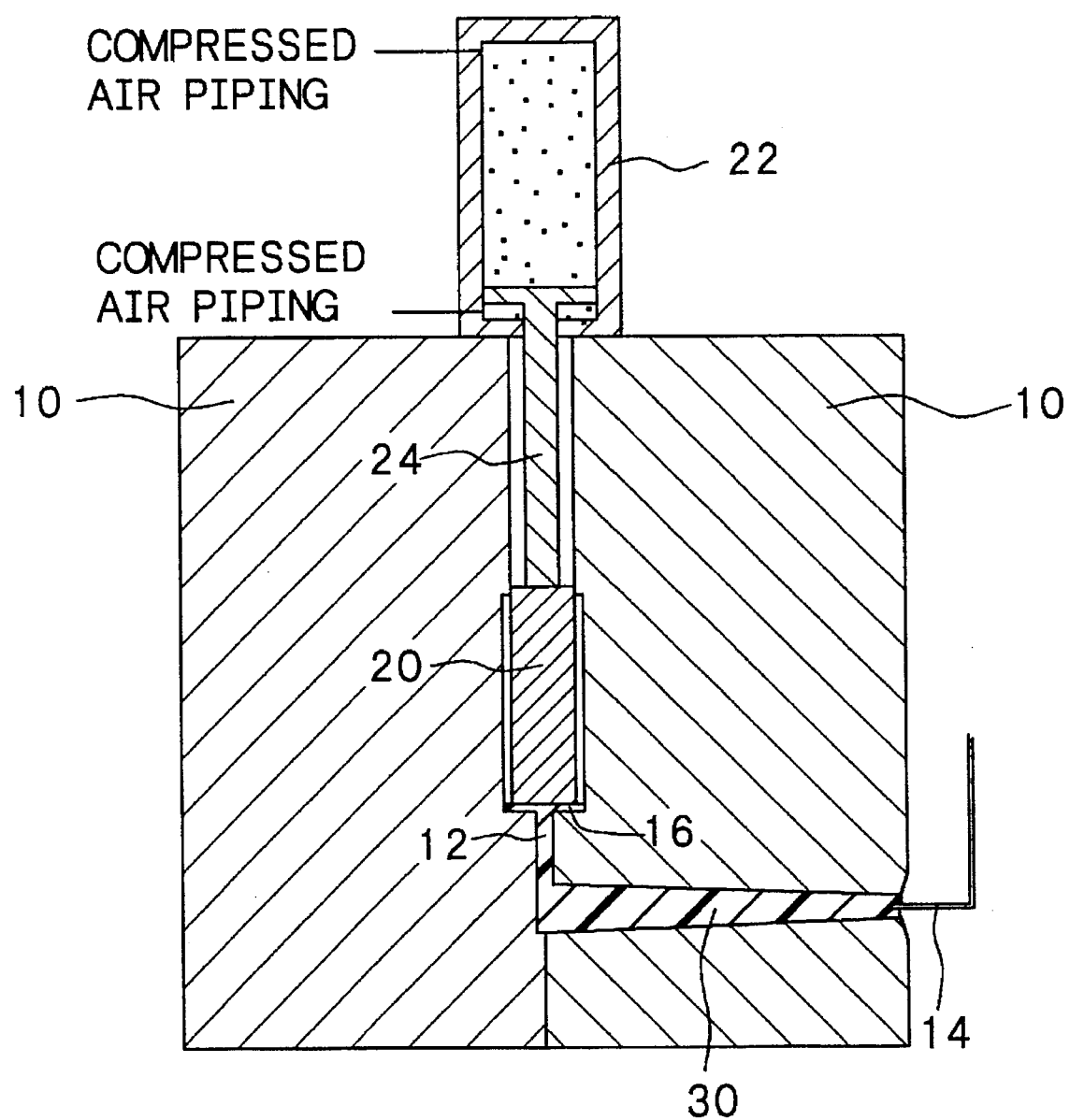
FIG. 18 is a schematic cross section of a mold apparatus, etc., for the explanation of a step of the injection molding process in Example 2.
Figure 19:
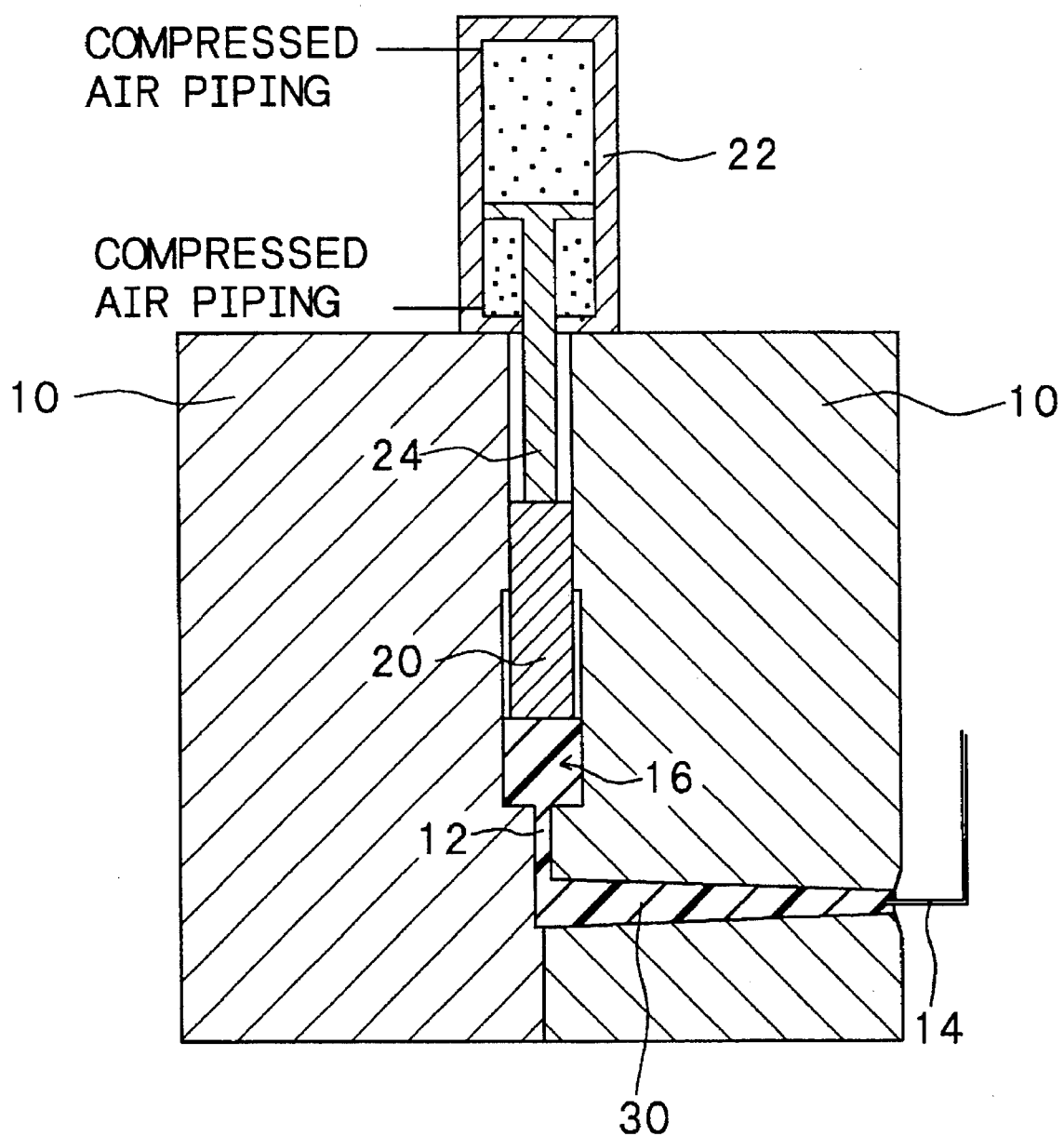
FIG. 19 is also a schematic cross section of a mold apparatus, etc., for the explanation of a step subsequent to the step of the injection molding process in Example 2 shown in FIG. 18.
Figure 20:
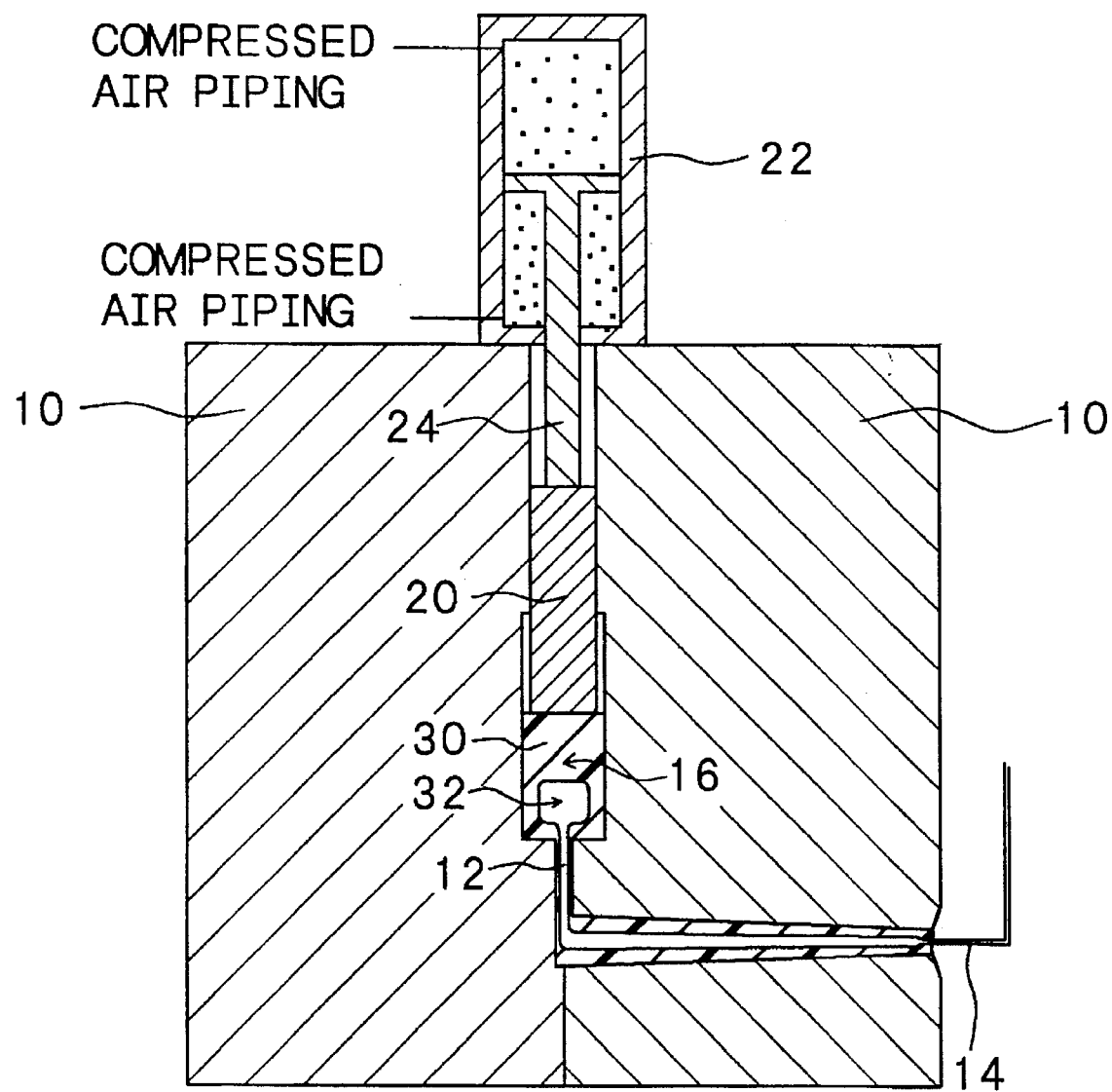
FIG. 20 is also a schematic cross section of a mold apparatus, etc., for the explanation of a step subsequent to the step of the injection molding process in Example 2 shown in FIG. 19.
Figure 21:
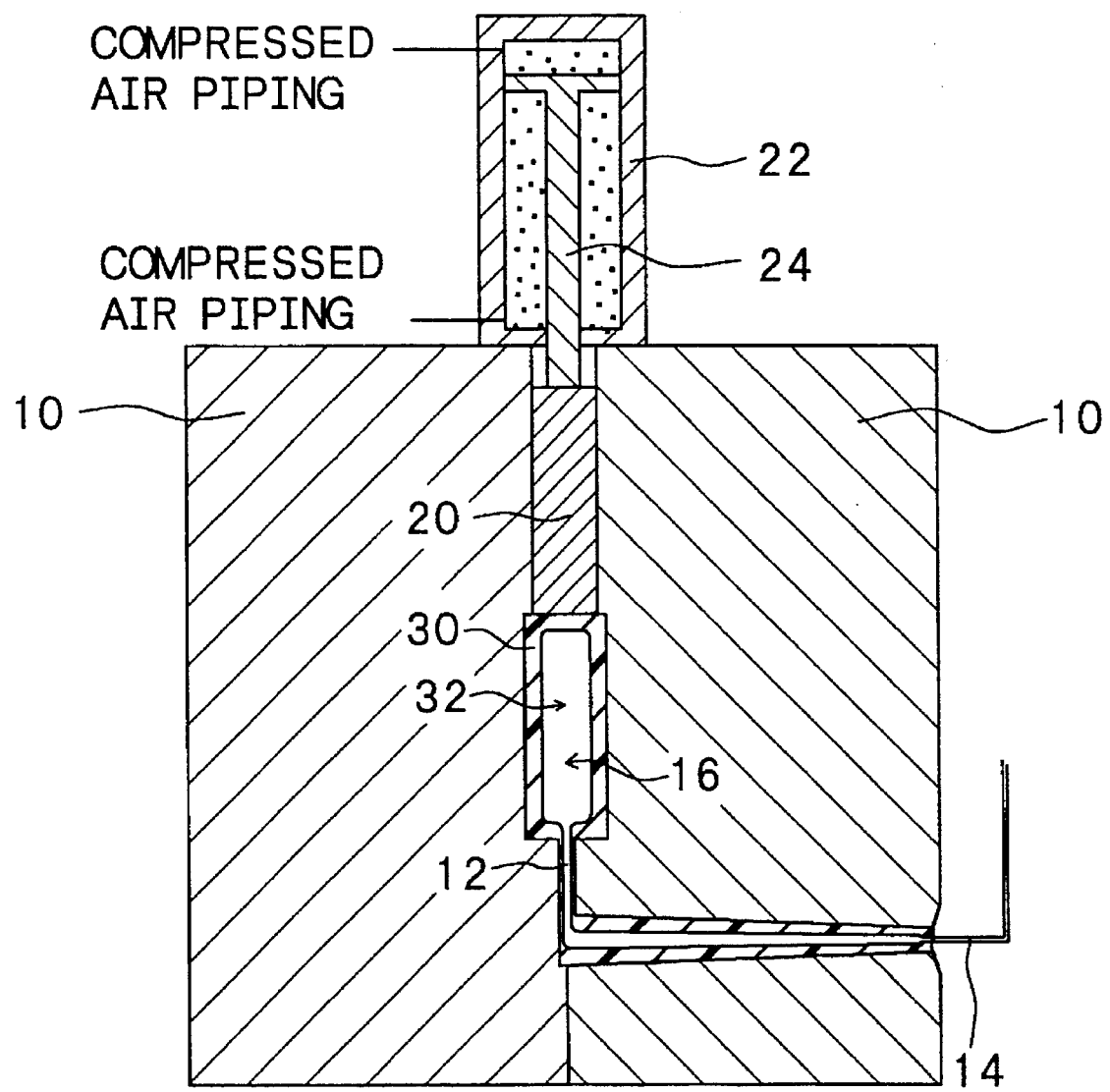
FIG. 21 is also a schematic cross section of a mold apparatus, etc., for the explanation of a step subsequent to the step of the injection molding process in Example 2 shown in FIG. 20.
Figure 22:
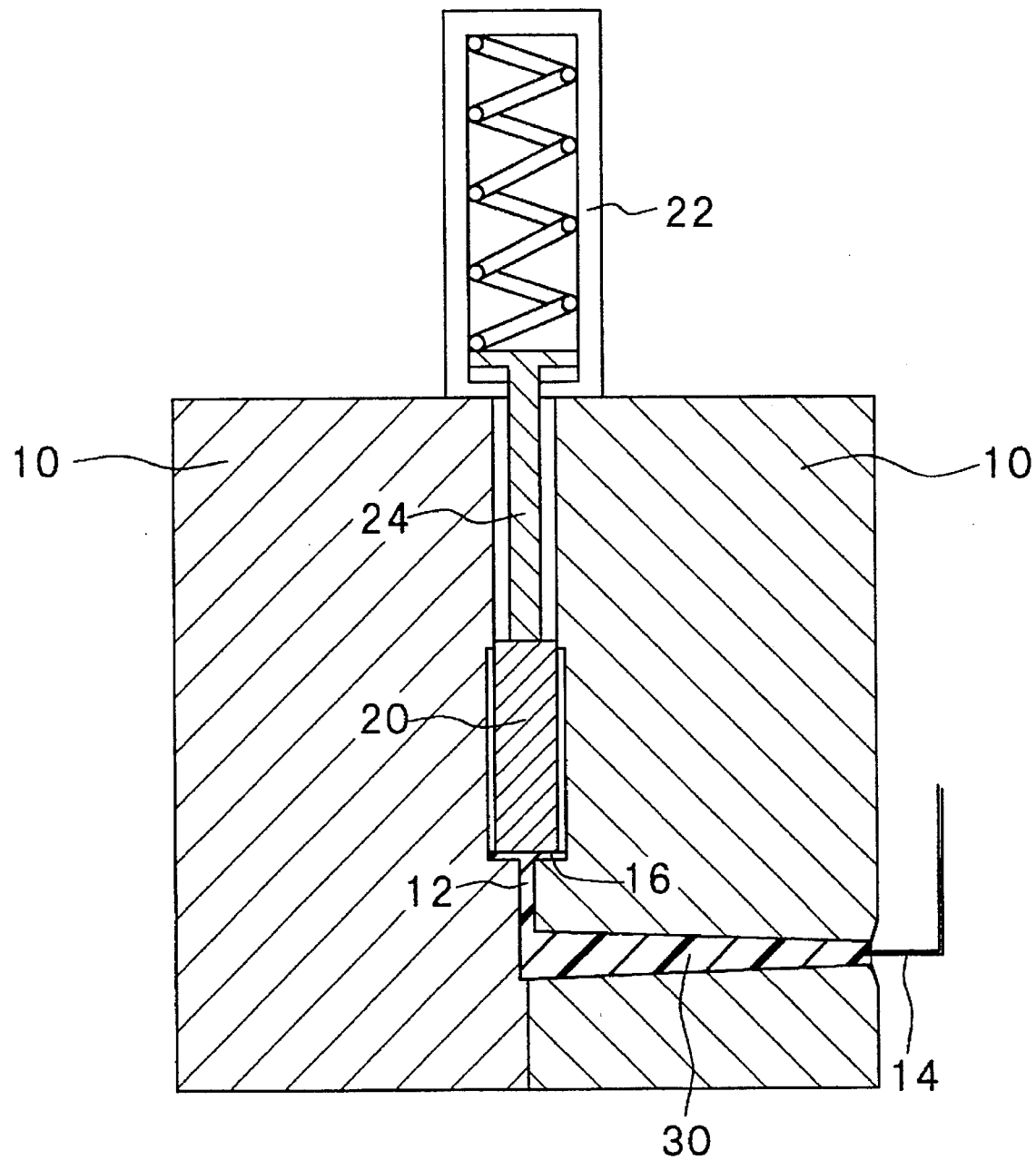
FIG. 22 is a schematic cross section of a mold apparatus, etc., for the explanation of a step of the injection molding process in Example 3.

Then, the molten resin 30 was injected into the cavity 16 through the resin injection portion 12 provided in the mold 10 (see FIG. 18). The injection pressure was set at 800 kgf/cm², and the injection rate was set at 70 cm³/second. The plug 20 had a resisting force against the pressure of the injected molten resin, provided by the plug-moving means 22. However, since the force of the molten resin under the injection pressure was greater than the resisting force, the plug 20 began to move nearly in parallel with the flow-axis direction of the molten resin toward its backward end position under the pressure of the injected molten resin, which state is shown in FIG. 19.

The injection of the molten resin was completed 1.7 seconds after the injection of the molten resin was initiated. Immediately thereafter, a pressurized fluid which was a compressed nitrogen gas having a pressure of 100 kgf/cm² was introduced into the molten resin 30 through the pressurized fluid introducing portion 14, and at the same time, the solenoid 40 (see FIG. 4) was switched to move the plug 20 with the plug-moving means 22 (see FIG. 20). The plug 20 was further moved and it arrived at its backward end position (see FIG. 21) by the plug-moving means 22. As a result, the hollow structure 32 was formed in the molten resin 30.

The pressurized fluid was maintained at a predetermined pressure for 50 seconds in the dwell period. After the resin was cooled for a predetermined period of time, the pressurized fluid in the hollow structure 32 was released into atmosphere through the pressurized fluid introducing portion 14. Then, the mold was opened, and a molded article was taken out. The molded article had a desired hollow structure, and its outer surface had no defect caused by jetting so that the molded article had an excellent appearance.

COMPARATIVE EXAMPLE 2

A molded article was produced in the same manner as in Example 2 except that the plug 20 was fixed in its backward end position. As a result, the outer surface of the molded article had defects caused by jetting.

EXAMPLE 3

Example 3 also relates to the first aspect of the injection molding process of the present invention, and uses a mold apparatus of which the plug-moving means 22 is composed of a spring as shown in FIG. 5.

The injection molding process in Example 3 will be explained hereinafter with reference to FIGS. 5 and 22 to 25 showing schematic cross sections of the mold apparatus, etc. In FIGS. 22 to 25, the cylinder of an injection molding machine and the pressurized fluid injection device are omitted.

The distance of movement of the plug 20 was set at 200 mm. The plug-moving means 22 was composed of a spring, and the spring had an energizing force of 20 kgf in the forward end position of the plug 20 and an energizing force of 50 kgf in the backward end position of the plug 20. The same resin as that used in Example 2 was injection-molded under the same conditions as those in Example 2.

Figure 23:
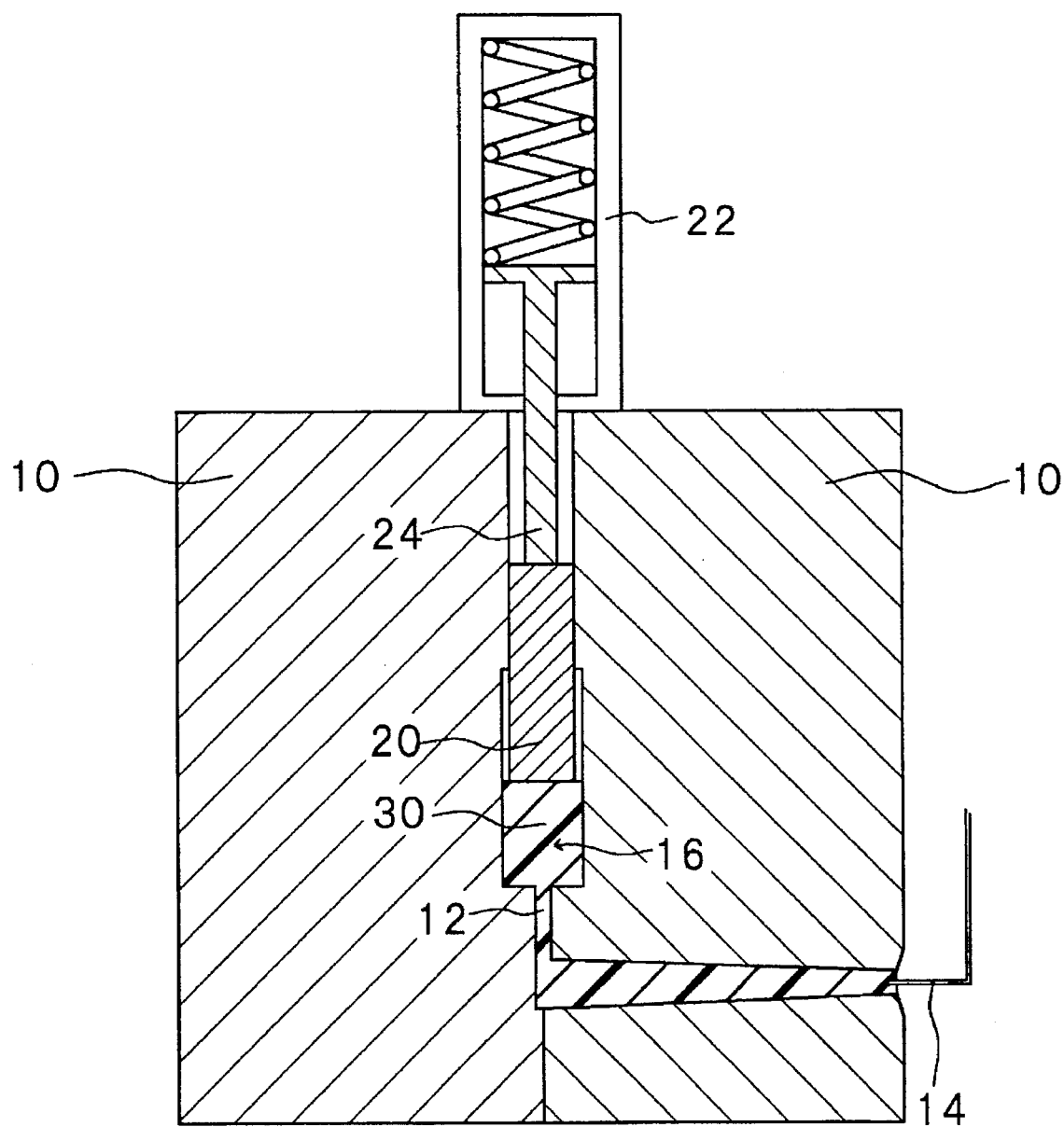
FIG. 23 is also a schematic cross section of a mold apparatus, etc., for the explanation of a step subsequent to the step of the injection molding process in Example 3 shown in FIG. 22.
Figure 24:
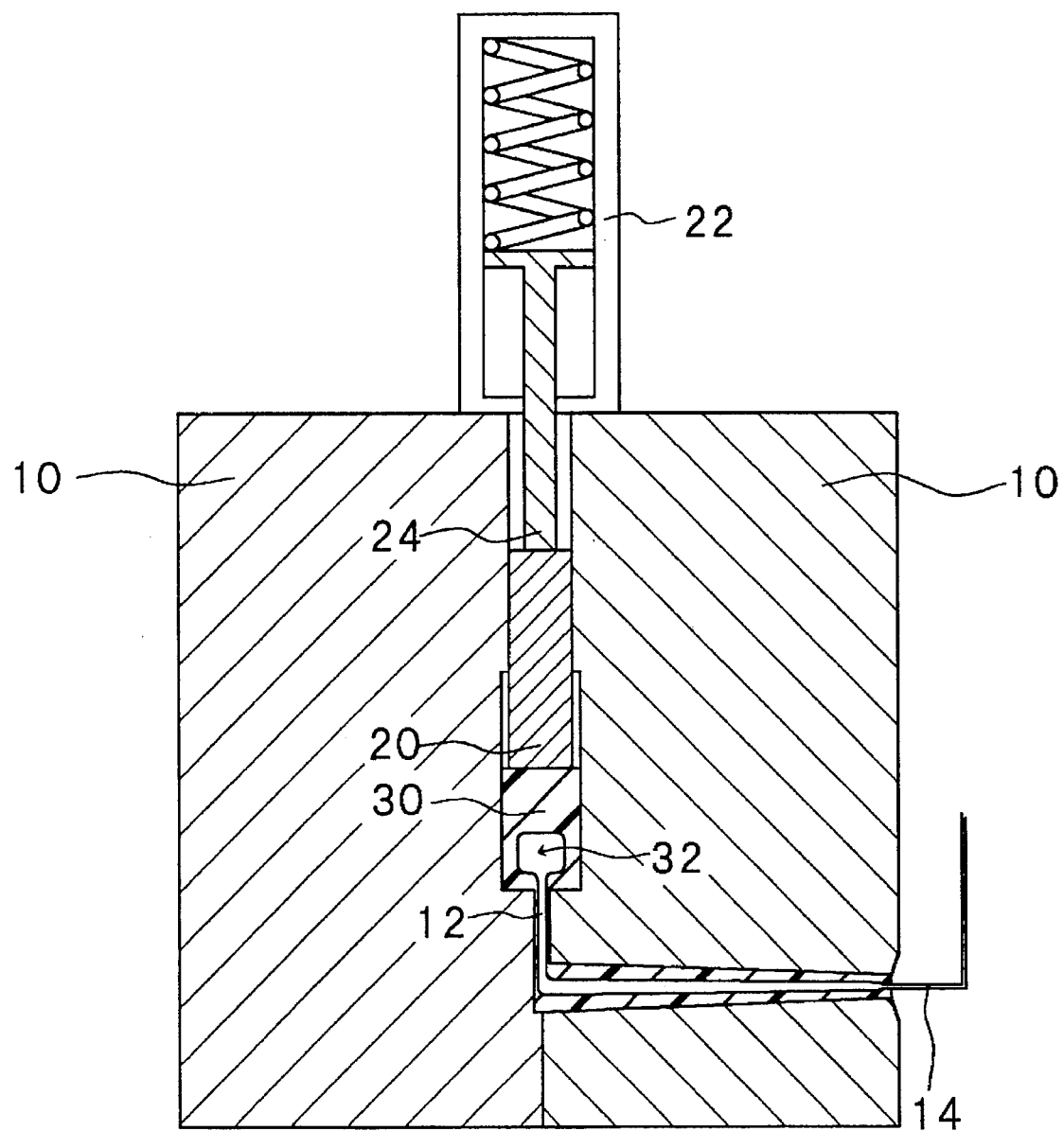
FIG. 24 is also a schematic cross section of a mold apparatus, etc., for the explanation of a step subsequent to the step of the injection molding process in Example 3 shown in FIG. 23.
Figure 25:
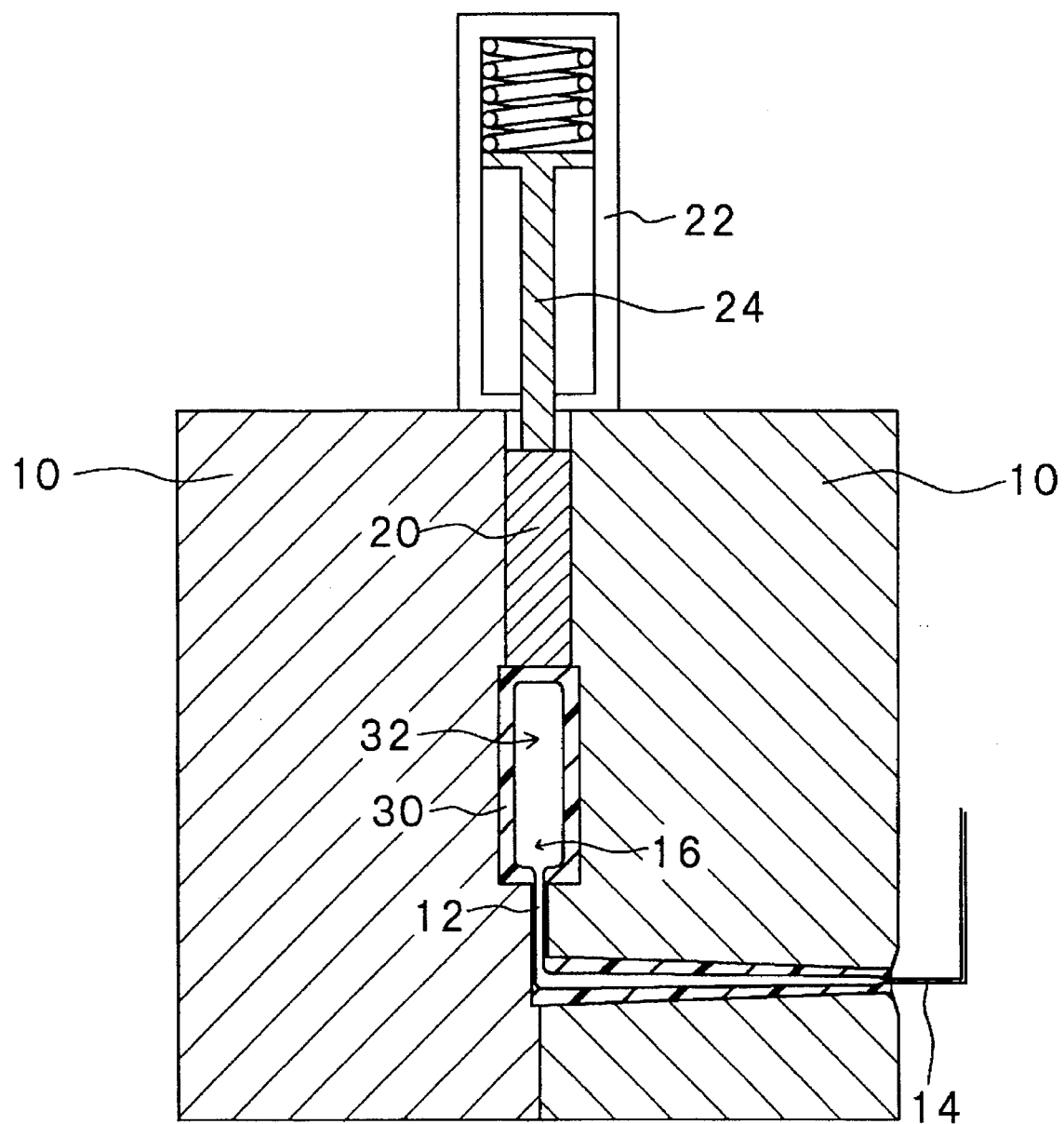
FIG. 25 is also a schematic cross section of a mold apparatus, etc., for the explanation of a step subsequent to the step of the injection molding process in Example 3 shown in FIG. 24.

First, the mold 10 was clamped, and before the injection of a molten resin was initiated, the plug 20 was maintained in its forward end position in the cavity 16 with the plug-moving means 22 (see FIG. 5). Then, the molten resin 30 was injected into the cavity 16 through the resin injection portion 12 provided in the mold 10 (see FIG. 22). The injection pressure was set at 1200 kgf/cm², and the injection rate was set at 70 cm³/second. The plug 20 had a resisting force against the pressure of the injected molten resin, provided by the plug-moving means 22. However, since the force of the molten resin under the injection pressure was greater than the resisting force, the plug 20 began to move nearly in parallel with the flow-axis direction of the molten resin toward its backward end position under the pressure of the injected molten resin, which state is shown in FIG. 23.

The injection of the molten resin 30 was completed 1.7 seconds after the injection of the molten resin 30 through the resin injection portion 12 was initiated. Immediately thereafter, a pressurized fluid which was a compressed nitrogen gas having a pressure of 100 kgf/cm² was introduced into the molten resin 30 through the pressurized fluid introducing portion 14. Under the pressure of the pressurized fluid introduced into the molten resin 30, the plug 20 was further moved nearly in parallel with the flow-axis direction of the molten resin toward its backward end position (see FIG. 24). Finally, the plug 20 arrived at its backward end position (see FIG. 25). As a result, the hollow structure 32 was formed in the molten resin 30.

The pressurized fluid was maintained at a predetermined pressure for 60 seconds in the dwell period, and after the resin was cooled for a predetermined period of time, the pressurized fluid in the hollow structure 32 was released into atmosphere through the pressurized fluid introducing portion 14. Then, the mold was opened, and a molded article was taken out. The molded article had a desired hollow structure, and its outer surface had no defect caused by jetting so that the molded article had an excellent appearance.

EXAMPLE 4

Example 4 relates to the fourth aspect of the injection molding process of the present invention, and uses a mold apparatus shown in FIG. 8A for producing a molded article having a T-letter shaped manifold structure. A T-letter shaped hollow structure 32 which works, e.g., as a path for the flow of a fluid, is formed in the molded article. In Example 4, after the completion of the injection of a molten resin 30 into the cavity 16 through the resin injection portion 12, a pressurized fluid is introduced into the molten resin 30 in the cavity 16 through the pressurized fluid introducing portion 14, and the molten resin 30 is cooled and solidified in the cavity 16 to form a molded article of the resin 30A having the hollow structure 32. In Example 4, during the injection of the molten resin 30 into the cavity 16, the plugs 20A and 20B are maintained in their forward end positions with the plug-moving means 22A and 22B, and after the injection of the molten resin 30 is completed, the pressurized fluid is introduced into the molten resin 30 in the cavity 16, and at the same time, the plugs 20A and 20B are moved nearly in parallel with the flow-axis direction of the molten resin 30 until they arrive at their backward end position.

Figure 26A:
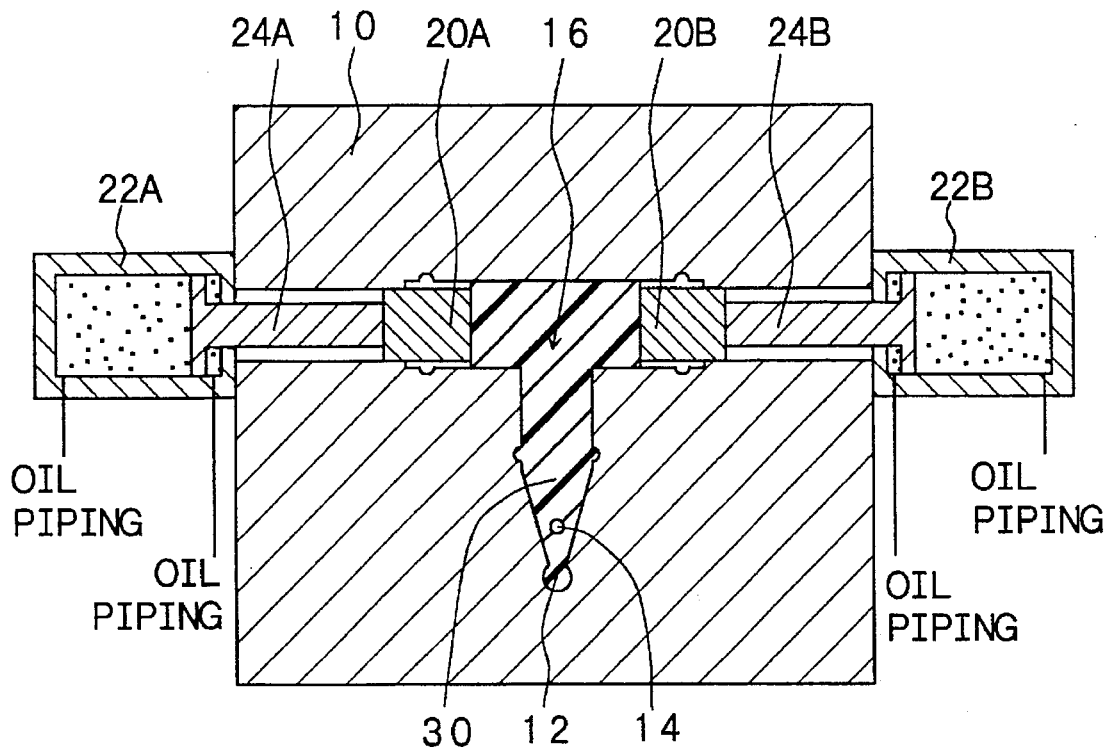
FIGS. 26A and 26B are schematic cross sections of a mold apparatus, etc., for the explanation of a step of the injection molding process in Example 4.
Figure 26B:
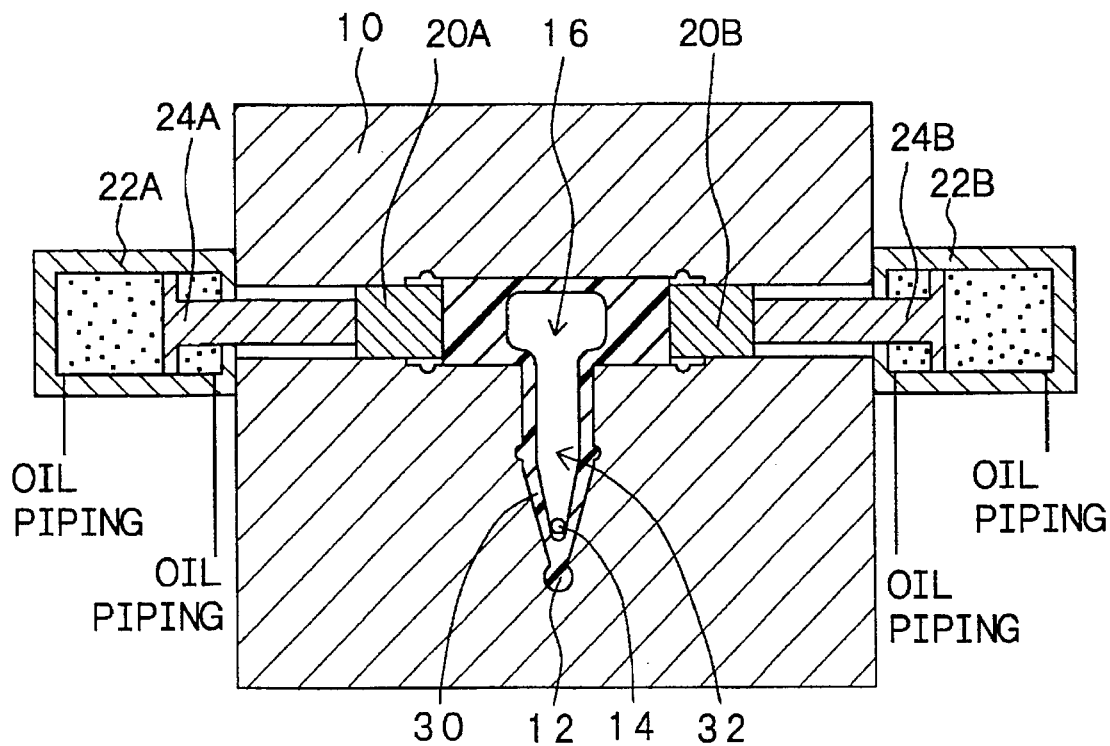
Figure 27:
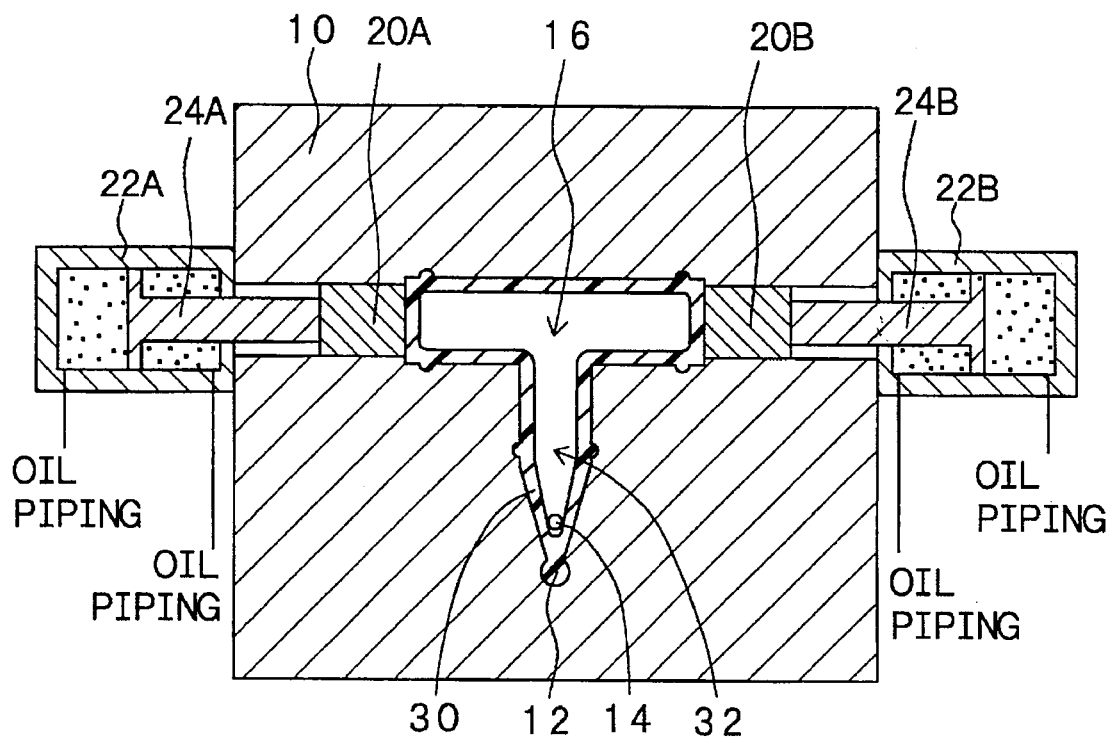
FIG. 27 is also a schematic cross section of a mold apparatus, etc., for the explanation of a step subsequent to the step of the injection molding process in Example 4 shown in FIG. 26B.

The injection molding process in Example 4 will be explained hereinafter with reference to FIGS. 8A, 26 and 27 which show schematic cross sections of a mold apparatus, etc., FIG. 2C which is a timing chart and FIG. 28 which shows a schematic cross section of a molded article.

Each of the plug-moving means 22A and 22B was composed of a hydraulic cylinder having a piston diameter of 30 mm, which was to work under the pressure of an oil. The distance of movement (sliding) of each of the plugs 20A and 20B was set at 30 mm. A modified PPE resin having a high viscosity (trade name "Iupiace AH110", natural color, supplied by Mitsubishi Engineering-Plastics Corp.) was plasticized and melted in the cylinder of an injection molding machine (not shown) at a resin temperature of 350° C. The mold temperature was set at 100° C.

First, the mold 10 was clamped. Then, before the injection of the molten resin was initiated, the plugs 20A and 20B were maintained in their forward end positions in the cavity 16 with the plug-moving means 22A and 22B so that the plugs 20A and 20B stood against the pressure of the molten resin to be injected (see FIG. 8A). In this case, each of the plug-moving means 22A and 22B, composed of hydraulic cylinders, was provided with an oil pressure of 100 kgf/cm² to stand against the pressure of the molten resin to be injected.

Then, the molten resin 30 was injected into the cavity 16 through the resin injection portion 12 provided in the mold 10. The injection pressure was set at 400 kgf/cm², and the injection rate was set at 70 cm³/second. During the injection of the molten resin 30 into the cavity 16, the plugs 20A and 20B were maintained in their forward end positions with the plug-moving means 22A and 22B (see FIG. 26A).

Immediately after the completion of molten resin injection into the cavity 16, a pressurized fluid which was a compressed nitrogen gas having a pressure of 100 kgf/cm² was introduced into the molten resin 30 through the pressurized fluid introducing portion 14. At the same time, the plugs 20A and 20B were moved nearly in parallel with the flow-axis direction of the molten resin with the plug-moving means 22A and 22B until they arrived at their backward end positions. FIG. 26B schematically shows a state of the plugs 20A and 20B which were being moved, and FIG. 27 schematically shows a state where the plugs 20A and 20B arrived at their backward end positions.

The pressurized fluid was maintained at a predetermined pressure for 70 seconds in the dwell period, and the resin was cooled for 10 seconds. Then, the pressurized fluid in the hollow structure 32 was released into atmosphere through the pressurized fluid introducing portion 14. Then, the mold was opened, and a molded article was taken out. FIG. 28A shows a schematic cross section of the molded article. Portions indicated by chain lines in FIG. 28A were removed to obtain a molded article of the resin 30A as a product shown in FIG. 28B. The molded article had a T-letter shaped manifold structure, and had a T-letter shaped hollow structure 32, e.g., as a path for the flow of a fluid.

COMPARATIVE EXAMPLE 3

A molded article having a T-letter shaped manifold structure was produced in the same manner as in Example 4 except that the plugs 20A and 20B were fixed in their backward end positions. As a result, no uniform hollow structure was formed in the molded article.

EXAMPLE 5

Example 5 relates to the second aspect of the injection molding process of the present invention, and uses a mold apparatus shown in FIG. 8B for producing a molded article having a T-letter shaped manifold structure. In the molded article, a T-letter shaped hollow structure 32, e.g., as a path for the flow of a fluid is formed. In Example 5, after the completion of the injection of a molten resin into the cavity 16 through the resin injection portion 12, a pressurized fluid is introduced into the molten resin 30 in the cavity 16 through the pressurized fluid introducing portion 14, and the molten resin is cooled and solidified in the cavity 16 to form a molded article of the resin 30A having the hollow structure 32. During the injection of the molten resin 30, the plug 20 is moved nearly in parallel with the flow-axis direction of the molten resin toward its backward end position with the plug-moving means 22, and during the injection of the molten resin, the plug 20 arrives at its backward end position. Then, the pressurized fluid is introduced into the molten resin 30 in the cavity 16.

The injection molding process in Example 5 will be explained hereinafter with reference to FIGS., 8B, 29 and 30 which show schematic cross sections of a mold apparatus, etc., and FIG. 1E which is a timing chart. The plug-moving means 22 was composed of a hydraulic cylinder having a piston diameter of 30 mm, which was to work under an oil pressure. The distance of movement (sliding) of the plug 20 was set at 50 mm.

First, the mold 10 was clamped, and then, before the injection of the molten resin was initiated, the plug 20 was maintained in its forward end position in the cavity 16 with the plug-moving means 22 (see FIG. 8B).

Figure 29A:
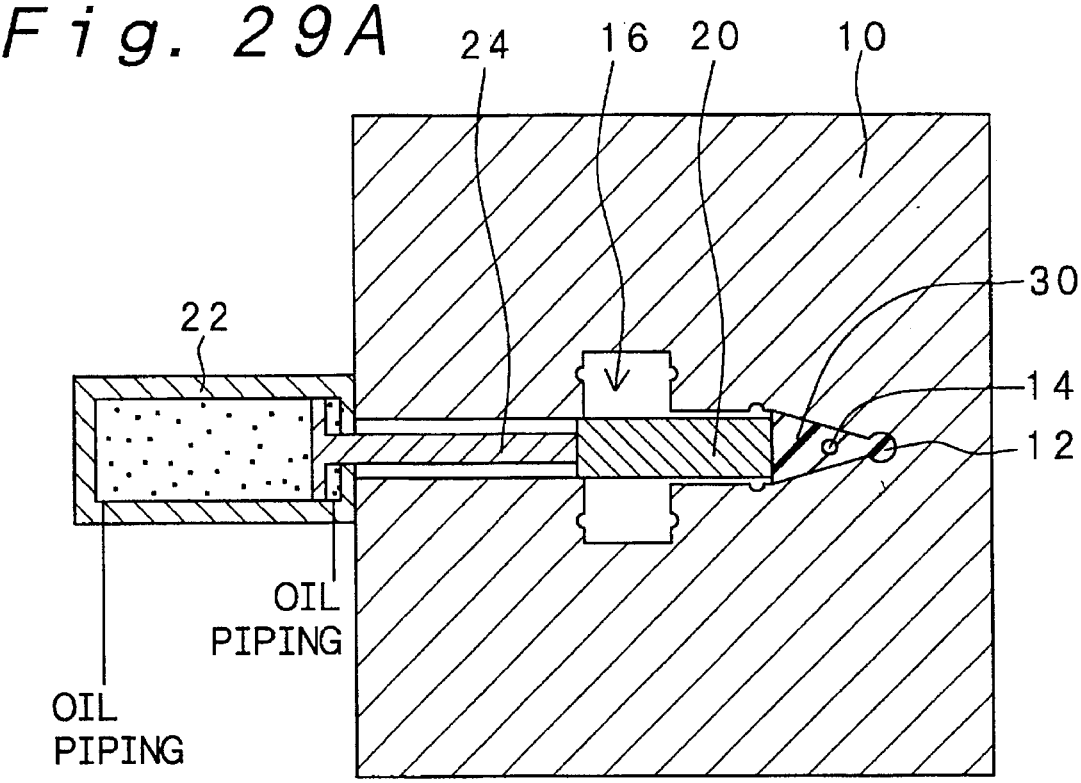
FIGS. 29A and 29B are schematic cross sections of a mold apparatus, etc., for the explanation of steps of the injection molding process in Example 5.
Figure 29B:
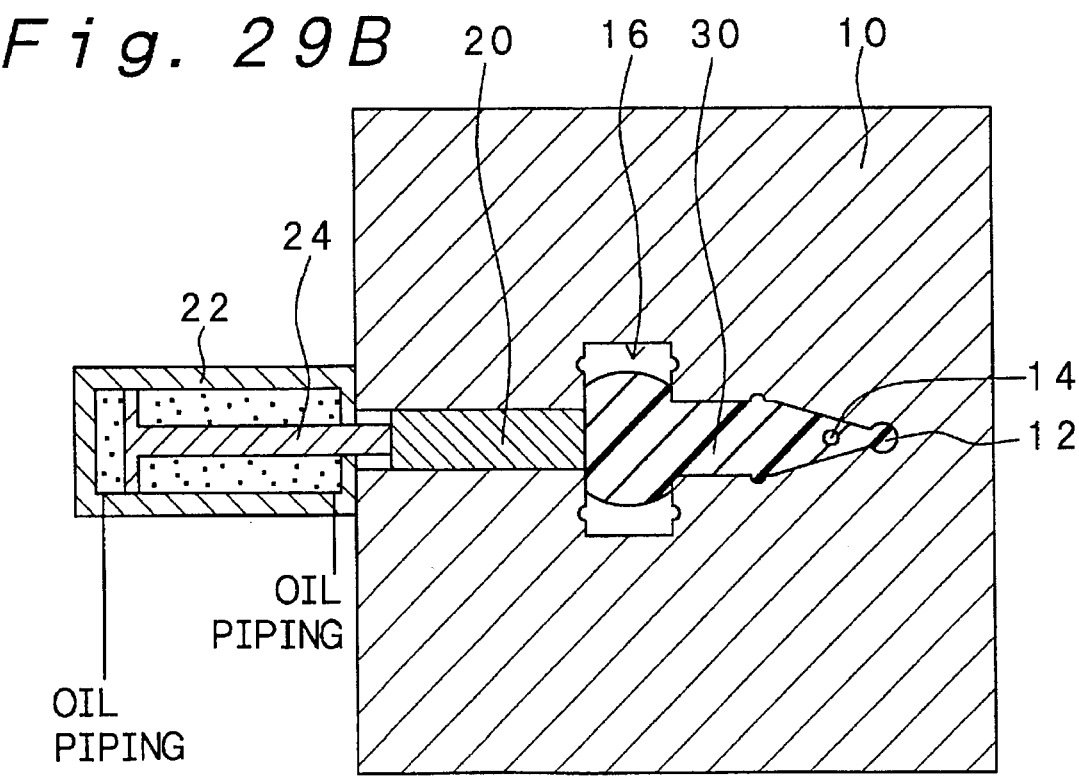

Then, the molten resin 30 was injected into the cavity 16 through the resin injection portion 12 provided in the mold 10 (see FIG. 29A). While the injection of the molten resin 30 into the cavity 16 was continued, the plug 20 was moved nearly in parallel with the flow-axis direction of the molten resin 30 toward its backward end position with the plug-moving means 22, and during the injection of the molten resin, the plug 20 arrived at its backward end position. Then, the injection of the molten resin 30 into the cavity 16 was completed (see FIG. 29B).

Figure 30A:
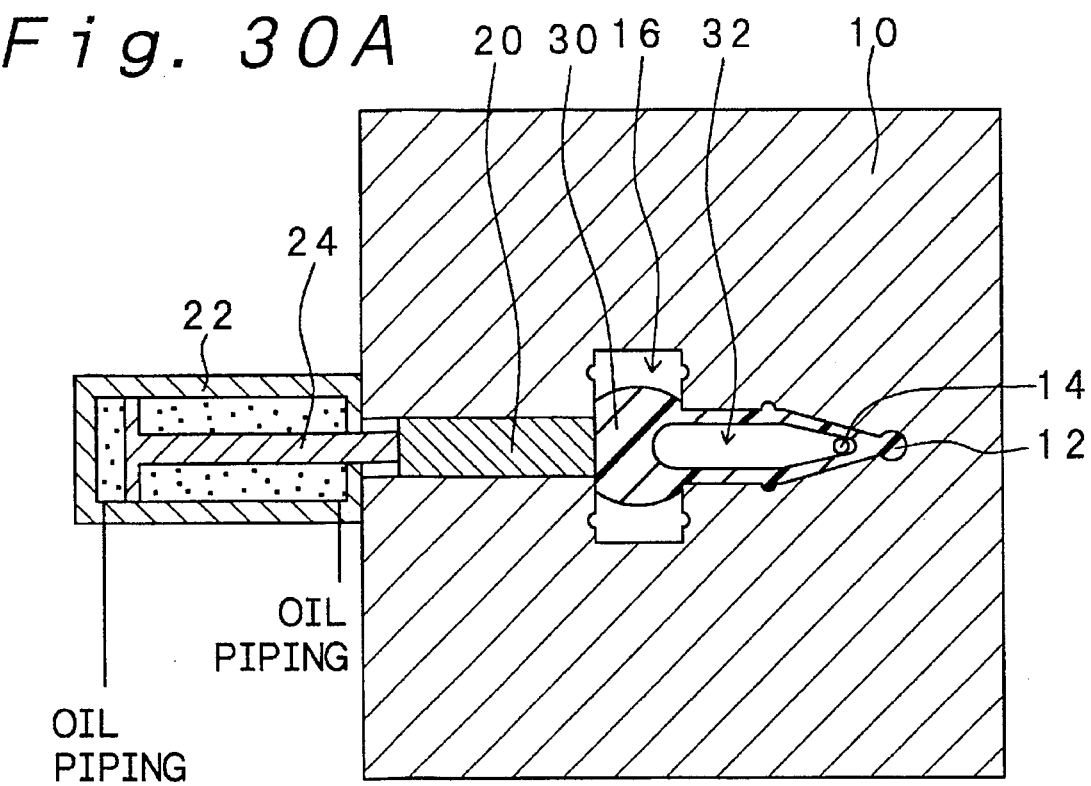
FIGS. 30A and 30B are schematic cross sections of a mold apparatus, etc., for the explanation of steps subsequent to the step of the injection molding process in Example 5 shown in FIG. 29B.
Figure 30B:
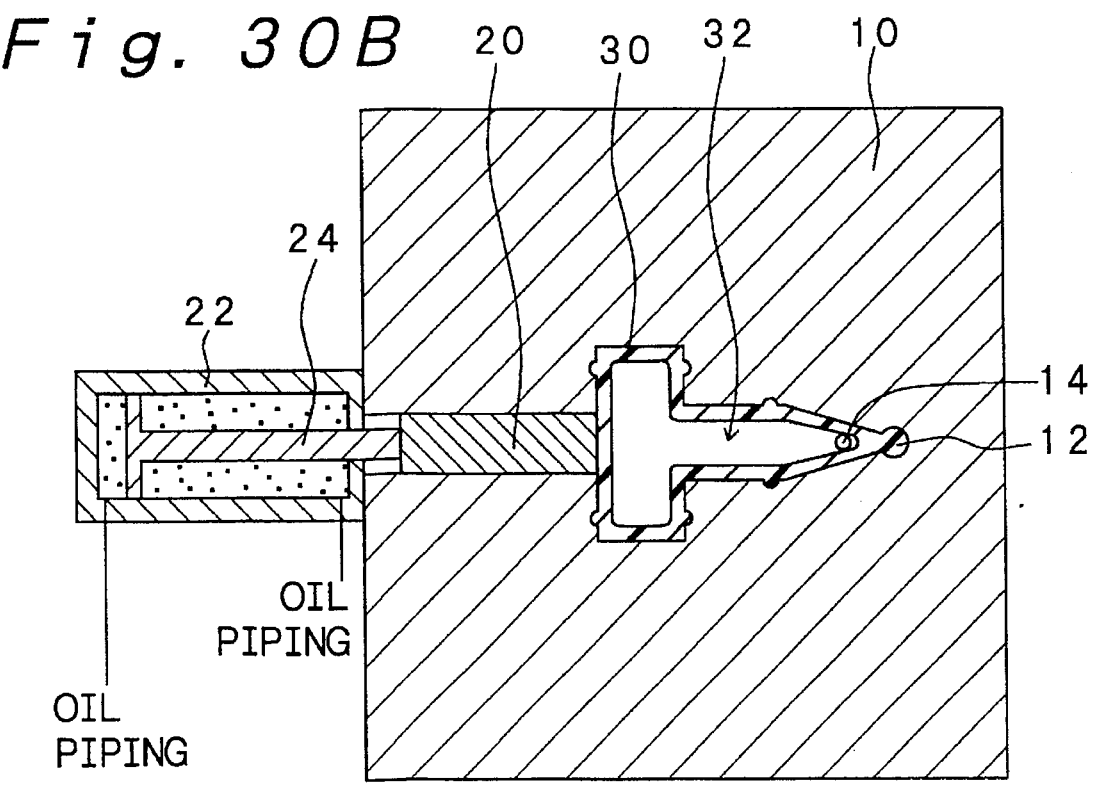

Immediately after the injection of the molten resin was completed, a pressurized fluid was introduced into the molten resin 30 through the pressurized fluid introducing portion 14 (see FIG. 30A). The pressurized fluid was maintained at a predetermined pressure for 70 seconds in the dwell period, and then the resin was cooled for 5 seconds, which state is schematically shown in FIG. 30B. Then, the pressurized fluid in the hollow structure 32 was released into atmosphere through the pressurized fluid introducing portion 14. Then, the mold was opened, and a molded article was taken out. FIG. 28A shows a schematic cross section of the molded article. Portions indicated by chain lines in FIG. 28A were removed to obtain a molded article of the resin 30A shown in FIG. 28B. The molded article had a T-letter shaped manifold structure, and had a T-letter shaped hollow structure 32, e.g., as a path for the flow of a fluid.

EXAMPLE 6

Example 6 relates to the third aspect of the injection molding process of the present invention, and uses a mold apparatus almost similar to the mold apparatus shown in FIG. 8A for producing a molded article having a T-letter shaped manifold structure. A T-letter shaped hollow structure 32, e.g., as a path for the flow of a fluid, is formed in the molded article. In Example 6, during the injection of a molten resin 30 into the cavity 16 through the resin injection portion 12, a pressurized fluid is introduced into the molten resin 30 in the cavity 16 through the pressurized fluid introducing portion 14, and the molten resin 30 is cooled and solidified to form a molded article of the resin 30A having a hollow structure 32. In Example 6, while the pressurized fluid is introduced into the molten resin 30 in the cavity 16 during the injection of the molten resin 30 into the cavity 16, the plugs 20A and 20B are moved nearly in parallel with the flow-axis direction of the molten resin 30 with the plug-moving means 22A and 22B until the plugs 20A and 20B arrive at their backward end positions.

The injection molding process in Example 6 will be explained hereinafter with reference to FIGS., 8A and 31A and 31B which show schematic cross sections of a mold apparatus, etc., and FIG. 2B which is a timing chart. Each of the plug-moving means 22A and 22B was composed of a hydraulic cylinder having a piston diameter of 30 mm, which was to work under an oil pressure. The distance of movement (sliding) of each of the plugs 20A and 20B was set at 50 mm.

First, the mold 10 was clamped, and then, before the injection of a molten resin, the plugs 20A and 20B were maintained in their forward end positions with the plug-moving means 22A and 22B (see FIG. 8A).

Figure 31A:
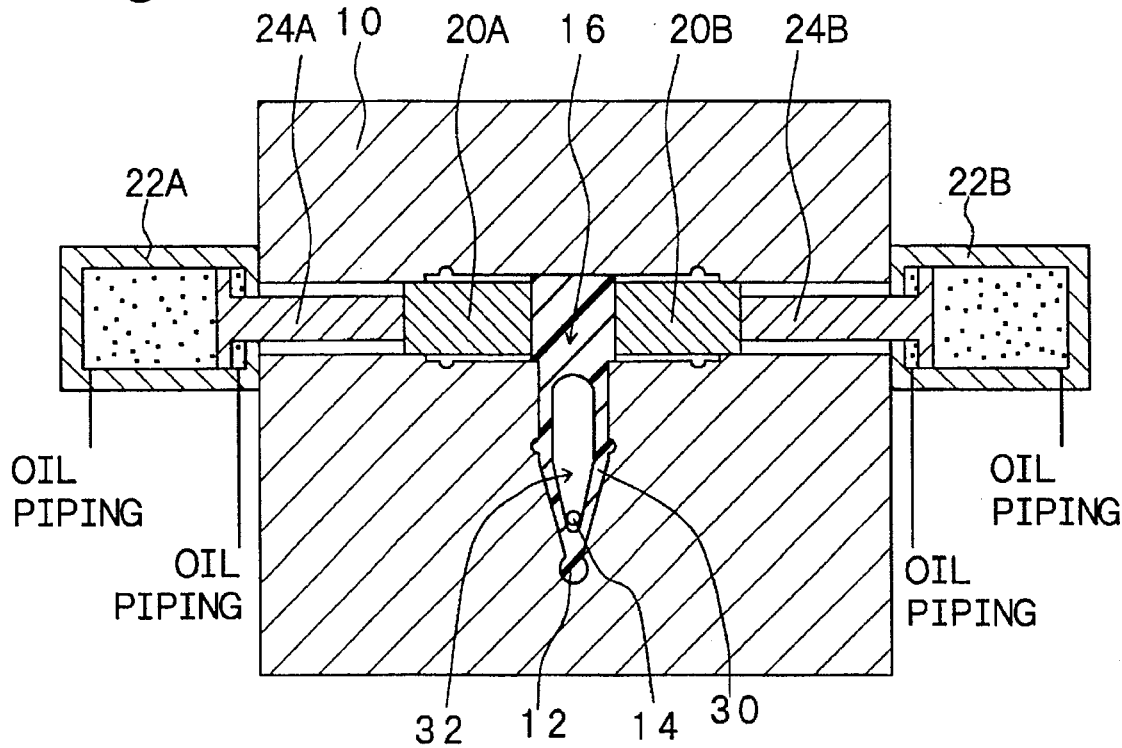
FIGS. 31A and 31B are schematic cross sections of a mold apparatus, etc., for the explanation of steps of the injection molding process in Example 6.

Then, the molten resin 30 was injected into the cavity 16 through the resin injection portion 12 provided in the mold 10. During the injection of the molten resin 30 into the cavity 16, the introduction of the pressurized fluid in the molten resin 30 in the cavity 16 was initiated (see FIG. 31A).

Figure 31B:
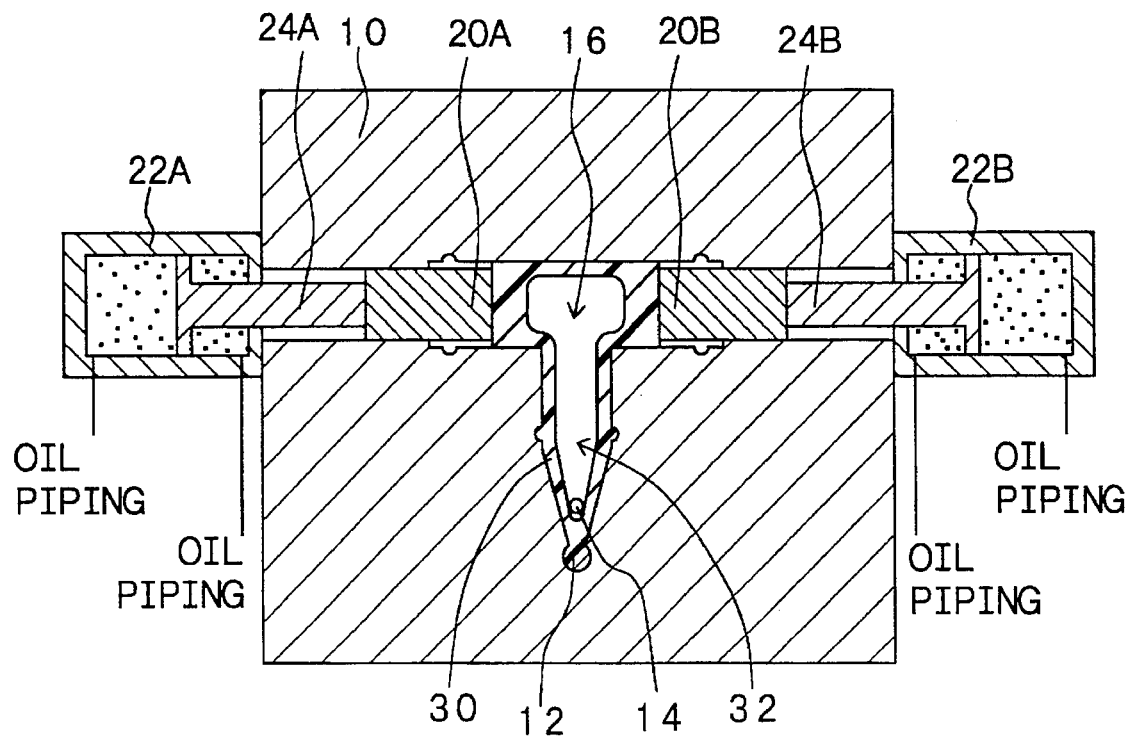
Figure 32A:
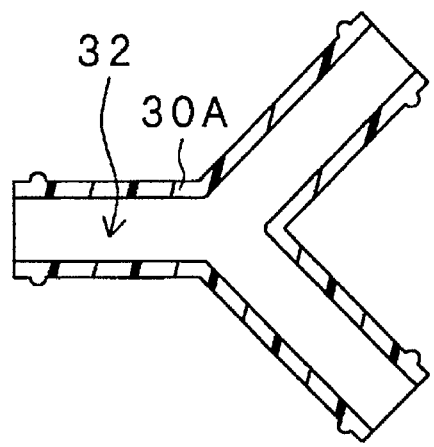
FIGS. 32A to 32C are schematic cross sections of molded articles produced according to the injection molding process of the present invention.
Figure 32B:
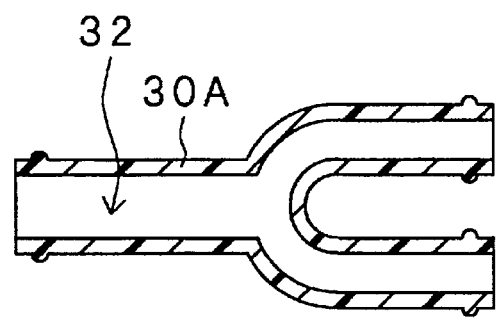
Figure 32C:
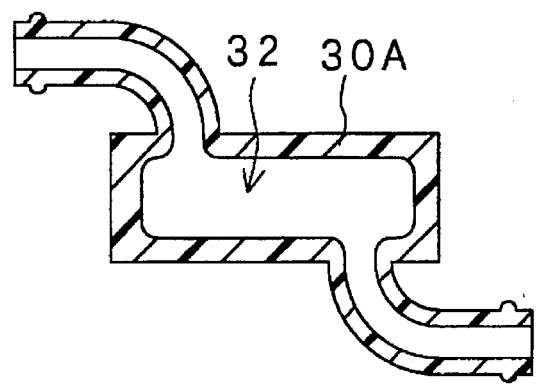
Figure 33A:
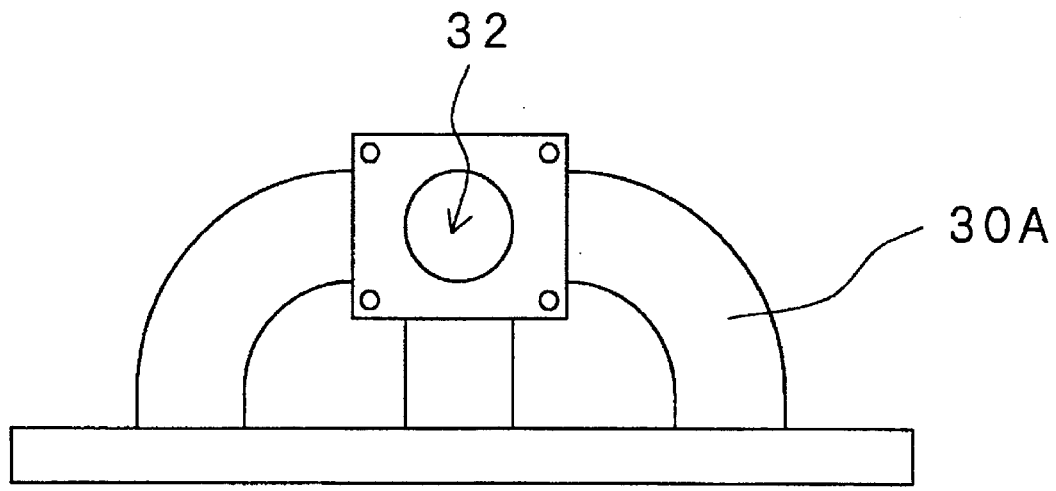
FIGS. 33A and 33B are schematic cross sections of molded articles produced according to the injection molding process of the present invention.
Figure 33B:
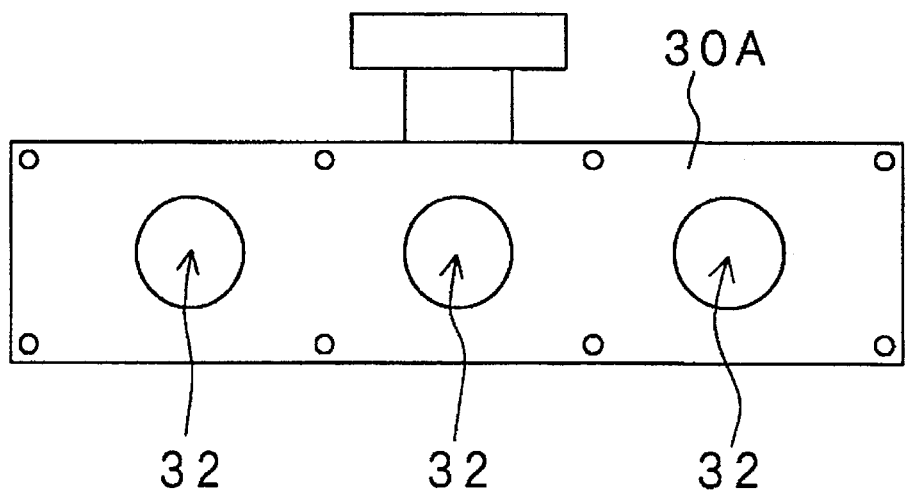

Then, while the molten resin 30 was injected into the cavity 16 with introducing the pressurized fluid into the molten resin 30 in the cavity 16, the plugs 20A and 20B were moved nearly in parallel with the flow-axis direction of the molten resin 30 with the plug-moving means 22A and 22B until the plugs 20A and 20B arrived at their backward end positions. The introduction of the pressurized fluid was continued after the completion of the injection of the molten resin 30. FIG. 31B shows a schematic cross section of the plugs 20A and 20B which were being moved. The state where the plugs 20A and 20B arrived at their backward end positions is almost the same as that shown in FIG. 27.

The pressurized fluid was maintained at a predetermined pressure for 80 seconds in the dwell period, and the resin was cooled for 5 seconds. Then, the pressurized fluid in the hollow structure 32 was released into atmosphere through the pressurized fluid introducing portion 14. Then, the mold was opened, and a molded article was taken out. The molded article had a cross section as schematically shown in FIG. 28A.

The present invention is explained hereinabove with reference to preferred Examples, while the present invention shall not be limited to those Examples. The structures of the mold apparatus, the various conditions for the injection molding process, and the resins used in Examples are described by way of examples, and may be changed as required. For example, the numbers and positions of resin injection portions and pressurized fluid introducing portions are described by way of examples, and may be changed as required. The plug(s) may be moved with the plug-moving means or may be moved with the pressure of a molten resin and/or a pressurized fluid introduced into the molten resin, or may be moved with the plug-moving means and the pressure of a molten resin and/or a pressurized fluid introduced into the molten resin. The mold apparatus of the present invention having no pressurized fluid introducing portion enables the production of a molded article having a solid structure, and in this case, the occurrence of jetting in a molten resin injected into a cavity can be effectively prevented.

According to the present invention, the occurrence of jetting in a molten resin injected into the cavity of a mold can be effectively prevented, and, as a result, a molded article having an excellent appearance can be obtained. In a conventional mold apparatus having a resin injection portion on the upper cavity surface, jetting is liable to occur since a molten resin is affected by gravity when the molten resin is injected into the cavity. The present invention uses plug(s), so that a molten resin is hardly affected by gravity when the molten resin is injected into the cavity. Therefore, the resin injection portion may be provided in any place in a mold, which increases the freedom of design of a mold apparatus.

Further, according to the present invention, a molded article having a hollow structure can be easily and reliably produced from a synthetic resin having a high melt viscosity. For a molded article having a hollow structure in which hollow branches have different diameters or different cross sections, a hollow structure, e.g., as a path for the flow of a fluid, can be reliably produced. Furthermore, a molded article has an improved appearance. Moreover, the present invention enables the production of a molded article having a complicated hollow structure as one product, so that the production cost can be decreased and that the steps of bonding or welding parts can be omitted. The productivity is therefore improved.

According to the present invention, there can be easily produced a molded article having a T-letter shaped hollow structure, a cross or "+" shaped hollow structure or a more complicated hollow structure, e.g., as a path for the flow of a fluid. Therefore, molded articles having a hollow structure, produced by the present invention, can be used as a tubing member in the fields of automobiles, motorcycles, electric appliances, machinery construction and medicine, and inexpensive molded articles can be provided.

What is claimed is:

1. A mold apparatus having a mold provided with a cavity, for use with an injection molding machine, for producing a tubular molded article having a hollow structure by introducing a pressurized fluid into a molten resin in the cavity while or after the molten resin is injected into the cavity, and cooling and solidifying the molten resin in the cavity to form a hollow structure in the tubular molded article in parallel with an axis thereof, said mold apparatus comprising (A) at least one plug which is provided in the cavity of the mold and is movable in parallel with the axis of the tubular molded article and in parallel with parting lines of the mold from a forward end position to a backward end position, for changing an effective volume of the cavity, (B) a plug-moving means for moving the plug, (C) a resin injection portion for injecting the molten resin into the cavity, and (D) a pressurized fluid introducing portion for introducing the pressurized fluid into the molten resin injected into the cavity;

wherein the plug has a top end portion and the plug is positioned so that the top end portion is positioned close to the resin injection portion when the plug is in the forward end position.

2. The mold apparatus of claim 1, wherein the plug-moving means is composed of a hydraulic cylinder or a pneumatic cylinder.

3. The mold apparatus of claim 1, wherein the plug-moving means is composed of a spring.

4. The mold apparatus of claim 1, wherein the plug-moving means is composed of a rack and pinion mechanism.

5. A process for the production of a tubular molded article having a hollow structure, using an injection molding machine equipped with a mold apparatus having a mold provided with a cavity, said mold apparatus comprising (A) at least one plug which is provided in the cavity of the mold and is movable in parallel with an axis of the tubular molded article and in parallel with parting lines of the mold from a forward end position to a backward end position, for changing an effective volume of the cavity, (B) a plug-moving means for moving the plug, (C) a resin injection portion for injecting the molten resin into the cavity, and (D) a pressurized fluid introducing portion for introducing a pressurized fluid into the molten resin injected into the cavity, wherein the plug has a top end portion and the plug is positioned that the top end portion is positioned close to the resin injection portion when the plug is in the forward end position, by introducing the pressurized fluid into the molten resin in the cavity of the mold throuhg the pressurized fluid introducing portion while or after the molten resin is injected into the cavity through the resin injection portion, and cooling and solidifying the resin in the cavity to form a hollow structure in the tubular molded article in the parallel with the axis thereof, said process comprising the steps of (a) positioning the plug in its forward end position in the cavity by the plug-moving means before the molten resin is injected, (b) moving the plug toward its backward end position in parallel with the axis of the tubular molded article and in parallel with the parting lines of the mold, by the plug-moving means or under a pressure of the injected molten resin, after the injection of the molten resin is initiated, (c) introducing the pressurized fluid into the molten resin in the cavity through the pressurized fluid introducing portion while the plug is moving, and (d) moving the plug up to its backward end position in parallel with the axis of the tubular molded article and in parallel with the parting lines of the mold, by the plug-moving means or under the pressure of the molten resin and/or the pressurized fluid introduced into the molten resin, and then, cooling and solidifying the molten resin in the cavity to form the hollow structure in the resin.

6. The process of claim 5, wherein the plug-moving means is composed of a hydraulic cylinder or a pneumatic cylinder.

7. The process of claim 5, wherein the plug-moving means is composed of a spring.

8. The process of claim 5, wherein the plug-moving means is composed of a rack and pinion mechanism.

9. The process of claim 5, wherein the molded article has a manifold structure.

10. A process for the production of a tubular molded article having a hollow structure, using an injection molding machine equipped with a mold apparatus having a mold provided with a cavity, said mold apparatus comprising (A) at least one plug which is provided in the cavity of the mold and is movable in parallel with an axis of the tubular molded article and in parallel with parting lines of the mold from a forward end position to a backward end position, for changing an effective volume of the cavity, (B) a plug-moving means for moving the plug, (C) a resin injection portion for injecting the molten resin into the cavity, and (D) a pressurized fluid introducing portion for introducing a pressurized fluid into the molten resin injected into the cavity, wherein the plug has a top end portion and the plug is positioned so that the top end portion is positioned close to the resin injection portion when the plug is in the forward end position, by introducing the pressurized fluid into the molten resin in the cavity of the mold through the pressurized fluid introducing portion while or after the molten resin is injected into the cavity through the resin injection portion, and cooling and solidifying the resin in the cavity to form a hollow structure in the tubular molded article in parallel with the axis thereof, said process comprising the steps of (a) positioning the plug in its forward end position in the cavity by the plug-moving means before the molten resin is injected, (b) moving the plug toward its backward end position in parallel with the axis of the tubular molded article and in parallel with the parting lines of the mold, by the plug-moving means or under a pressure of the injected molten resin, after the injection of the molten resin is initiated, and allowing the plug to arrive at its backward end position during the injection of the molten resin or after the injection of the molten resin is completed, (c) introducing the pressurized fluid into the molten resin in the cavity through the pressurized fluid introducing portion, and (d) then, cooling and solidifying the molten resin in the cavity to form the hollow structure in the resin.

11. The process of claim 10, wherein the plug-moving means is composed of a hydraulic cylinder or a pneumatic cylinder.

12. The process of claim 10, wherein the plug-moving means is composed of a spring.

13. The process of claim 10, wherein the plug-moving means is composed of a rack and pinion mechanism.

14. The process of claim 10, wherein the molded article has a manifold structure.

15. A process for the production of a tubular molded article having a hollow structure, using an injection molding machine equipped with a mold apparatus having a mold provided with a cavity, said mold apparatus comprising (A) at least one plug which is provided in the cavity of the mold and is movable in parallel with an axis of the tubular molded article and in parallel with parting lines of the mold from a forward end position to a backward position, for changing an effective volume of the cavity, (B) a plug-moving means for moving the plug, (C) a resin injection portion for injecting the molten resin into the cavity, and (D) a pressurized fluid introducing portion for introducing a pressurized fluid into the molten resin injected into the cavity, wherein the plug has a top end portion and the plug is positioned so that the top end portion is positioned close to the resin injection portion when the plug is in the forward end position, by introducing the pressurized fluid into the molten resin in the cavity of the mold through the pressurized fluid introducing portion while the molten resin is injected into the cavity through the resin injection portion, and cooling and solidifying the resin in the cavity to form a hollow structure in the tubular molded article in parallel with the axis thereof, said process comprising the steps of (a) positioning the plug in its forward end position in the cavity by the plug-moving means before the molten resin is injected, (b) moving the plug toward its backward end position in parallel with the axis of the tubular molded article and in parallel with the parting lines of the mold, by the plug-moving means or under a pressure of the injected molten resin and/or a pressure of the pressurized fluid introduced into the molten resin, while the molten resin is injected into the cavity and while the pressurized fluid is introduced into the molten resin, and allowing the plug to arrive at its backward end position during the introduction of the pressurized fluid, and (c) then, cooling and solidifying the molten resin in the cavity to form the hollow structure in the resin.

16. The process of claim 15, wherein the plug-moving means is composed of a hydraulic cylinder or a pneumatic cylinder.

17. The process of claim 15, wherein the plug-moving means is composed of a spring.

18. The process of claim 15, wherein the plug-moving means is composed of a rack and pinion mechanism.

19. The process of claim 15, wherein the molded article has a manifold structure.

20. A process for the production of a tubular molded article having a hollow structure, using an injection molding machine equipped with a mold apparatus having a mold provided with a cavity, said mold apparatus comprising (A) at least one plug which is provided in the cavity of the mold and is movable in parallel with an axis of the tubular molded article and in parallel with parting lines of the mold from a forward end position to a backward end position, for changing an effective volume of the cavity, (B) a plug-moving means for moving the plug, (C) a resin injection portion for injecting the molten resin into the cavity, and (D) a pressurized fluid introducing portion for introducing a pressurized fluid into the molten resin injected into the cavity, wherein the plug has a rod end portion and the plug is positioned so that the top end portion is positioned close to the resin injection portion when the plug is in the forward end position, by introducing the pressurized fluid into the molten resin in the cavity of the mold through the pressurized fluid introducing portion after the molten resin is injected into the cavity through the resin injection portion, and cooling and solidifying the resin in the cavity to form a hollow structure in the tubular molded article in parallel with the axis thereof, said process comprising the steps of (a) positioning the plug in its forward end position in the cavity so as to allow the plug to stand against a pressure of the molten resin to be injected, by the plug-moving means before the molten resin is injected, (b) maintaining the plug in its forward end position by the plug-moving means during the injection of the molten resin through the resin injection portion, (c) moving the plug toward its backward end position in parallel with the axis of the tubular molded article and in parallel with the parting lines of the mold, by the plug-moving means or under a pressure of the pressurized fluid, after the injection of the molten resin is completed and after or before the introduction of pressurized fluid is initiated, and allowing the plug to arrive at its backward end position during the introduction of the pressurized fluid, and (d) then, cooling and solidifying the molten resin in the cavity to form the hollow structure in the resin.

21. The process of claim 20, wherein the plug moving means is composed of a hydraulic cylinder or a pneumatic cylinder.

22. The process of claim 20, wherein the plug moving means is composed of a spring.

23. The process of claim 20, wherein the plug moving means is composed of a rack and pinion mechanism.

24. The process of claim 20, wherein the molded article has a manifold structure.

* * * * *